(12) United States Patent
Bodoin

(10) Patent No.: US 11,588,146 B2
(45) Date of Patent: Feb. 21, 2023

(54) LITHIUM METAL ANODE AND BATTERY

(71) Applicant: Pure Lithium Corporation, Long Island, NY (US)

(72) Inventor: Emilie Bodoin, Long Island, NY (US)

(73) Assignee: Pure Lithium Corporation, Charlestown, MA (US)

( * ) Notice: Subject to any disclaimer, the term of this patent is extended or adjusted under 35 U.S.C. 154(b) by 99 days.

(21) Appl. No.: 17/006,048

(22) Filed: Aug. 28, 2020

(65) Prior Publication Data
US 2022/0069282 A1    Mar. 3, 2022

(51) Int. Cl.
*H01M 4/134* (2010.01)
*H01M 4/04* (2006.01)
(Continued)

(52) U.S. Cl.
CPC ......... *H01M 4/134* (2013.01); *H01M 4/0452* (2013.01); *H01M 4/1395* (2013.01); *H01M 4/366* (2013.01); *H01M 4/382* (2013.01); *H01M 4/661* (2013.01); *H01M 4/663* (2013.01); *H01M 4/667* (2013.01); *H01M 10/052* (2013.01); *H01M 2004/021* (2013.01); *H01M 2004/027* (2013.01)

(58) Field of Classification Search
CPC .... H01M 4/382; H01M 4/045; H01M 4/0452; H01M 10/052; H01M 10/0562; H01M 4/134; H01M 4/1395; H01M 4/366; H01M 4/661; H01M 4/663; H01M 4/667; H01M 2004/021; H01M 2004/027; Y02E 60/10; Y02P 70/50; Y02T 10/70
See application file for complete search history.

(56) References Cited

U.S. PATENT DOCUMENTS 4,009,052 A    2/1977   Whittingham
4,781,756 A    11/1988  Frianeza-Kullberg et al.
(Continued)

OTHER PUBLICATIONS

Nakajima et al., "Lithium Ion Conductive Glass Ceramics: Properties and Application in Lithium Metal Batteries", Symposium on Energy Storage Beyond Lithium Ion, Oak Ridge National Laboratory, pp. 1-28, Oct. 8, 2010.
(Continued)

*Primary Examiner* — Allison Bourke
*Assistant Examiner* — Jason Barton
(74) *Attorney, Agent, or Firm* — Sunstein LLP

(57) ABSTRACT

A lithium metal electrode has no more than five ppm of non-metallic elements by mass, and is bonded to a conductive substrate. Optionally, the lithium metal electrode may be bonded on one side to a conductive substrate and on another side to a lithium ion selective membrane. The lithium metal electrode may be integrated into lithium metal batteries. The inventive lithium metal electrode may be manufactured by a process involving electrolysis of lithium ions from an aqueous lithium salt solution through an ion selective membrane, carried out under a blanketing atmosphere having no more than 10 ppm of non-metallic elements, the electrolysis being performed at a constant current between about 10 mA/cm$^2$ and about 50 mA/cm$^2$, and wherein the constant current is applied for a time between about 1 minute and about 60 minutes.

25 Claims, 13 Drawing Sheets

(51) Int. Cl.
*H01M 4/1395* (2010.01)
*H01M 4/36* (2006.01)
*H01M 4/38* (2006.01)
*H01M 4/66* (2006.01)
*H01M 10/052* (2010.01)
*H01M 4/02* (2006.01)

(56) References Cited

U.S. PATENT DOCUMENTS

| | | |
|---|---|---|
| 2015/0014184 A1 | 1/2015 | Swonger |
| 2016/0351889 A1 | 12/2016 | Swonger et al. |
| 2018/0097221 A1 | 4/2018 | Swonger et al. |
| 2018/0198170 A1* | 7/2018 | Fujita .................... H01M 4/663 |
| 2018/0371632 A1 | 12/2018 | Bodoin et al. |
| 2019/0048483 A1 | 2/2019 | Swonger et al. |
| 2019/0051885 A1 | 2/2019 | Swonger et al. |
| 2019/0194373 A1 | 6/2019 | Ma et al. |
| 2019/0226108 A1 | 7/2019 | Swonger |
| 2020/0002153 A1* | 1/2020 | Delmas ................ H05B 1/0247 |
| 2020/0086281 A1* | 3/2020 | Hryn .................. B01D 67/0079 |
| 2020/0087806 A1 | 3/2020 | Hryn et al. |
| 2020/0091509 A1 | 3/2020 | Hym et al. |
| 2020/0136178 A1* | 4/2020 | Ku ......................... H01M 4/38 |
| 2020/0149174 A1 | 5/2020 | Swonger |
| 2020/0203705 A1 | 6/2020 | Swonger et al. |
| 2021/0336274 A1* | 10/2021 | Jung ................ H01M 10/0562 |
| 2021/0381115 A1* | 12/2021 | Kang .................. C25D 7/0621 |

OTHER PUBLICATIONS

Miashtalir et al., "High-Purity Lithium Metal Films from Aqueous Mineral Solutions", ACS Omega, vol. 3, pp. 181-187, Jan. 8, 2018.
International Searching Authority—International Search Report, pertaining to International Application No. PCT/US2021/042696, dated Nov. 5, 2021, together with the Written Opinion of the International Searching Authority, 17 pages.
International Searching Authority—International Search Report, pertaining to International Application No. PCT/US2021/042694, dated Nov. 4, 2021, together with the Written Opinion of the International Searching Authority, 11 pages.
Choudhury et al., "A Highly Reversible Room-Temperature Lithium Metal Battery Based on Crosslinked Hairy Nanoparticles", Nature Communications, Dec. 2015, 9 pages.
Choudhury et al., "Electroless Formation of Hybrid Lithium Anodes for Fast Interfacial Ion Transport", Agnew. Chem. Int. Ed. 2017, vol. 56, pp. 13070-13077.
Choudhury et al. ,"Designer Interphases for the Lithium-Oxygen Electrochemical Cell", Sci. Adv., Apr. 19, 2017, 11 pages.
Zhao et al., "Solid-State Polymer Electrolytes with In-Built Fast Interfacial Transport for Secondary Lithium Batteries", Nature Energy, vol. 4, May 2019, pp. 365-373.
Gannett et al., "Cross-Linking Effects on Performance Metrics of Phenazine-Based Polymer Cathodes", ChemSusChem, 2020, vol. 13, pp. 2428-2435.
Stalin et al., "Designing Polymeric Interphases for Stable Lithium Metal Deposition", American Chemical Society, Jun. 1, 2020, 10 pages.
Harry et al., "Detection of Subsurface Structures Underneath Dendrites Formed on Cycled Lithium Metal Electrodes", Nature materials, vol. 13, Jan. 2014, pp. 69-73.
Qian et al. "Dendrite-Free Li Deposition Using Trace-Amounts of Water as an Electrolyte Additive", Nano Energy, 2015, vol. 15, pp. 135-144.
Mashtalir et al., "High-Purity Lithium Metal Films from Aqueous Mineral Solutions", ACS Omega, 2018, vol. 3, pp. 181-187.
Lee et al. "Dendrite-Free Lithium Deposition for Lithium Metal Anodes with Interconnected Microsphere Protection", Chem. Mater., Jul. 2017, vol. 29, pp. 5906-5914.

\* cited by examiner

LITHIUM METAL ANODE AND BATTERY

TECHNICAL FIELD

The present invention relates to the production of highly pure lithium for use in lithium metal batteries, and the integration of lithium metal production with the production of Li batteries. The resultant batteries are manufactured in a fully charged state, and have increased cycle life compared to conventional manufacturing methods.

CROSS-REFERENCE TO RELATED APPLICATIONS

Related application filed on the same date as the present application and having the same inventor and same assignee as the present application, entitled "Vertically Integrated Pure Lithium Metal Production and Lithium Battery Production" and having assigned application Ser. No. 17/006,073 is hereby incorporated by reference.

BACKGROUND ART

Lithium ion batteries (LIBs) dominate the lithium battery market. LIBs contain lithium which is only present in an ionic form. Such batteries have good charging density and can function effectively through multiple charge/discharge cycles. Lithium metal batteries (LMBs) by contrast, use non-ionic lithium metal at the negative electrode. During discharge of an LMB, lithium ions are released from this electrode, as electrons flow through an external circuit. As the LMB recharges, lithium ions are reduced back to lithium metal as electrons flow back into the negative electrode. Because LMBs have intrinsically higher capacity than LIBs, they are the preferred technology for primary batteries. Moreover, since LMBs can be manufactured in the fully charged state, they do not require the lengthy formation process needed for LIBs, which can take between 20-30 days. However, poor cycle life, volumetric expansion, and the tendency to form lithium metal dendrites, which can lead to violent combustion of LMBs, have limited their practical use as rechargeable batteries.

Lithium anodes in rechargeable lithium metal batteries (LMBs) are considered the "Holy Grail" of anode materials due to their remarkably high theoretical specific capacity of 3860 mAh/g and low reaction voltage. Lithium metal is the lightest metal on the periodic table, and it is especially desired for applications that require a low ratio of volume to weight, such as electric vehicles. The most promising LMB's are Lithium Sulfur (Li—S), Lithium Air (Li—$O_2$), and Solid-State or Semi-Solid LMB's. While primary batteries manufactured with lithium metal foils are widely commercialized, numerous barriers to the commercialization of rechargeable LMB's include low Coulombic efficiency, poor cycle life, soft shorts, volumetric expansion and the growth of Li dendrites during plating—which can lead to thermal runaway and other catastrophic failures. Tremendous efforts have been made to suppress dendrite formation including by providing additives in electrolytes, varying the salt concentration, creating artificial passivating layers on lithium metal (allowing one to handle lithium metal in dry air for a brief amount of time, but at the cost of higher impedance), and manipulating electrode-electrolyte interfacial structure—which is extremely difficult to do when a foil is mechanically fused to a substrate to create a negative electrode, and that negative electrode is then mechanically fused to a solid-state electrolyte.

Other barriers include the quality and cost of available lithium metal raw material, handling of lithium metal, and the mechanical challenges of manufacturing a lithium anode. These barriers increase by orders of magnitude when attempting to mechanically manufacture a solid-state LMB. Since 1976, researchers—including Nobel Prize winners—have attempted to solve all these problems to no avail. It is 2020 and the absence of a commercially viable battery for consumer applications—despite the efforts of the best minds in the field—is stinging.

The current commercially available supply of lithium metal is produced by molten salt electrolysis of lithium chloride. Lithium is poured into a mold and extruded into foils that range in thickness from 100 µm-750 µm. For environmental reasons, lithium metal foils are generally produced in China. Because of lithium's classification as a flammable and potentially explosive material, these foils must then be shipped under mineral oil to a battery manufacturer. The process yields an impure foil that, under SEM imaging, appears intrinsically dendritic, with an uneven surface that can vary by +/−50 µm (U.S. Pat. No. 10,177,366, FIG. 11A). The resulting impure product, while sufficient for primary lithium batteries, is not usable in rechargeable LMB's.

Shipping and handling, and the required immersion in mineral oil compromise the integrity of the lithium metal. Prior to use in batteries, the mineral oil must be removed, which further compromises the lithium. Some battery developers manually scrape lithium from under the top layer to use and spread it on the copper or other substrate like peanut butter. Some take the lithium metal foil, and vapor deposit it onto a substrate, which is both expensive and energy intensive.

Impurities in the present supply of lithium metal foil provide an additional barrier to the commercialization of LMB's. As an alkali metal, lithium has one loosely held valence electron, causing it to be inherently reactive. Notably, lithium is the only alkali metal that reacts with nitrogen in the air, forming the nitride $Li_3N$. Due to undesirable side-reactions, the introduction of impurities into the lithium foil severely limits the operation of a working battery. In particular, a recent study found that such impurities can lead to the nucleation of sub-surface dendritic structures. (Harry et al., Nat. Mater. 13, 69-73 (2014)). The manufacturer of the lithium foil in the study (FMC Lithium) listed a number of elements other than lithium, the most abundant at a concentration of 300 ppm by weight is nitrogen, likely in the form of $Li_3N$. (U.S. Pat. No. 4,781,756). Other common impurities include: Na, Ca, K, Fe, Si, Cl, B, Ti, Mg and C. While this is not an exhaustive list, the elements mentioned are the most common. Nitrogen in any form is particularly undesirable in rechargeable LMBs. Nitrogen forms voids and pits in the lithium metal as a battery cycles and also consumes lithium with these reactions. The presence of impurities such as nitrogen leads to slowed and uneven lithium deposition on a negative electrode during charging, affecting the overall current distribution in the battery and creating hot spots.

The unevenness of the lithium foil surface caused by nitrogen and other impurities is also highly problematic because it prevents uniform contact of the substrate with the electrode, leading to soft shorts and again, uneven distribution of current, which in turn can lead to dendrites and other undesirable effects.

A method is needed to provide a pure lithium metal anode, which overcomes the purity issues heretofore limiting the capacity and recycling life of LMBs.

SUMMARY OF THE EMBODIMENTS

While the general approach is to suppress all the problems inherent in the existing supply of raw material, an approach which has not been successful in over forty-three years, the inventor proposes to address the materials problem and the manufacturing problem simultaneously by producing a highly improved lithium metal product (a full negative electrode) and vertically integrating lithium metal production into battery manufacturing facilities.

In preferred embodiments, a lithium metal electrode includes a conductive substrate, and a first layer of lithium metal having an inner face and an outer face, the inner face bonded to the conductive substrate, wherein the first layer includes no more than five ppm of non-metallic elements by mass. In some embodiments first layer includes no more than one ppm of non-metallic element by mass. In some embodiments first layer includes no more than one ppm of nitrogen by mass. In some embodiments, the outer face of the first layer of lithium metal is bonded to a first lithium ion-selective membrane. In some embodiments, the first lithium ion-selective membrane is configured as a solid state electrolyte.

In some embodiments, the conductive substrate includes a plate having a first face and a second face, wherein the inner face of the first layer of lithium metal is bonded to the first face of the conductive substrate. In some embodiments, the conductive substrate further includes a second layer of lithium metal having an inner face and an outer face, the inner face of the second layer of lithium metal being bonded to the second face of the conductive substrate, wherein the second layer includes no more than five ppm of non-metallic elements by mass. In some embodiments, the outer face of the first layer of lithium metal is bonded to the first lithium ion-selective membrane and the outer face of the second layer of lithium metal is bonded to a second lithium ion-selective electrode. In some embodiments, the first and the second lithium ion-selective membranes are configured as solid state electrolytes.

In some embodiments, the electrode has a specific capacity of greater than about 3800 mAh per gram of lithium metal. In some embodiments, the first layer of lithium metal has a density of between about 0.45 $g/cm^3$ and about 0.543 $g/cm^3$. In some embodiments, the second layer of lithium metal has a density of between about 0.45 $g/cm^3$ and about 0.543 $g/cm^3$.

In some embodiments, the conductive substrate is selected from the group consisting of copper, aluminum, graphite coated copper, and nickel. In some embodiments, the first lithium metal electrode has a thickness between about 1 micron and about 50 microns. In some embodiments, the second lithium metal electrode has a thickness between about 1 micron and about 50 microns.

In some embodiments, a lithium metal battery incorporates one or more lithium metal electrodes of the instant invention.

In a preferred embodiment, the lithium metal electrode is manufactured according to a method comprising:

1. providing a gas-impermeable container, the container enclosing:
   a blanketing atmosphere, the blanketing atmosphere having no more than 10 ppm of lithium reactive components on a molar basis;
   an electrolytic cell, the electrolytic cell being blanketed completely by the blanketing atmosphere, and including:
   a first chamber containing a positive electrode, and an aqueous lithium salt solution in contact with the positive electrode;
   a second chamber containing a conductive substrate configured as a negative electrode, the conductive substrate being immovable within the second chamber, a lithium ion-selective membrane separating the first chamber from the second chamber, a space separating the conductive substrate and the lithium ion-selective membrane, and a non-aqueous electrolyte disposed in the space between the conductive substrate and the lithium ion selective membrane, physically contacting both the conductive substrate and the lithium ion selective membrane;
   the electrolytic cell being configured to allow passage of lithium ions through the lithium ion selective membrane between the first and the second chambers, and to preclude the passage of other chemical species between the first and the second chambers;

2. applying a variable voltage in order to maintain a constant current across the negative electrode and the positive electrode, thereby causing lithium ions to cross from the first chamber to the second chamber, through the lithium ion selective membrane and the non-aqueous electrolyte, and electroplate a layer of lithium onto the conductive substrate, the layer of lithium having an inner face bonded to the conductive substrate and an outer face directed towards the lithium ion-selective membrane, thereby forming the lithium metal electrode, comprising the layer of lithium bonded to the conductive substrate, wherein the constant current is between about 10 $mA/cm^2$ and about 50 $mA/cm^2$, and wherein the constant current is applied for a time between about 1 minute and about 60 minutes.

In some embodiments, when the lithium metal electrode is manufactured in this manner, the lithium ion selective membrane is stationary within the electrolytic cell, and as the layer of lithium is formed, the layer of lithium displaces non-aqueous electrolyte from the space between the conductive substrate and the lithium ion-selective membrane, thereby bonding an inner face of the first layer of lithium to the conductive substrate and the outer face of the first layer of lithium to the ion selective membrane, thereby forming a lithium metal electrode comprising the conductive substrate and the layer of lithium metal, with the inner face of the layer of lithium bonded to the conductive substrate, and the outer face of the layer of lithium bonded to the lithium ion-selective membrane, which is configured to function as a solid state electrolyte when the lithium metal electrode is incorporated into a galvanic cell.

In some embodiments, when the lithium metal electrode is manufactured in this manner, the aqueous lithium salt solution comprises a lithium salt selected from the group consisting of $Li_2SO_4$, $Li_2CO_3$, and combinations thereof. In some embodiments, the aqueous lithium salt solution comprises $Li_2SO_4$. In some embodiments, the blanketing atmosphere comprises argon with a purity of greater than 99.999 mole percent.

In some embodiments, a lithium metal electrode is manufactured according to a method comprising:

3. providing a gas-impermeable container, the container enclosing:
   a blanketing atmosphere, the blanketing atmosphere having no more than 10 ppm of lithium reactive components on a molar basis;

an electrolytic cell, the electrolytic cell being blanketed completely by the blanketing atmosphere, and including:
- a conductive substrate, immovable within the container, configured as a negative electrode;
- a positive electrode;
- an aqueous lithium salt solution interposed between the conductive substrate and the positive electrode;
- a lithium ion-selective membrane covering the conductive substrate, configured as a solid state electrolyte, and forming a barrier separating the aqueous lithium salt solution and the conductive substrate;
- the electrolytic cell being configured to allow passage of lithium ions from the lithium salt solution through the lithium ion selective membrane and onto the surface of the conductive substrate, and to preclude the passage of other chemical species;

4. applying a variable voltage in order to maintain a constant current across the negative electrode and the positive electrode, thereby causing lithium ions to cross from the lithium salt solution through the lithium ion selective membrane, and electroplate the first layer of lithium onto the conductive substrate, the inner face of the first layer of lithium thereupon being bonded to the conductive substrate, and the outer face being bonded to the lithium ion selective membrane;

wherein the constant current is between about 10 mA/cm$^2$ and about 50 mA/cm$^2$, and wherein the constant current is applied for a time between about 1 minute and about 60 minutes.

In some embodiments, when the lithium metal electrode is manufactured in this manner, the aqueous lithium salt solution comprises a lithium salt selected from the group consisting of $Li_2SO_4$, $Li_2CO_3$, and combinations thereof. In some embodiments, the aqueous lithium salt solution comprises $Li_2SO_4$. In some embodiments, the blanketing atmosphere comprises argon with a purity of greater than 99.999 mole percent.

In some embodiments, the lithium ion selective membrane comprises a polymeric matrix and a plurality of ion-conducting particles disposed within the polymeric matrix.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "cathode" is an electrode where reduction occurs.

An "anode" is an electrode where oxidation occurs.

A "working anode" is the anode in a galvanic cell.

A "positive electrode" is the anode in an electrolytic cell, and the cathode in a galvanic cell.

A "negative electrode" is the cathode in an electrolytic cell and the anode in a galvanic cell. Consequently, a lithium metal electrode is always a "negative electrode" even though it is a cathode in an electrolytic cell and an anode in a galvanic cell.

In the context of this application, a "lithium metal electrode" and a "lithium electrode" are synonymous, and each refers to a negative electrode comprising lithium metal.

A "lithium metal battery" (or "LMB") is a battery that utilizes a negative electrode comprising pure lithium metal (i.e. a lithium metal electrode). The positive electrode for such a battery is typically an intercalation compound such as $Ti_2S$, which, during discharge, accepts electrons through an external circuit from the anode, and intercalates $Li^+$ into its lattice structure.

A "lithium ion battery" is a rechargeable battery where lithium ions shuttle between a negative electrode and an intercalation compound as the positive electrode.

A blanketing atmosphere is "substantially free" of lithium reactive components when the atmosphere includes no more than 10 ppm of lithium reactive components.

In the context of this disclosure, a "vertically integrated" lithium metal manufacturing facility is a facility where lithium metal anodes are fabricated by electrodepositing at the facility, and integrated into the battery manufacturing process.

Figure 1:
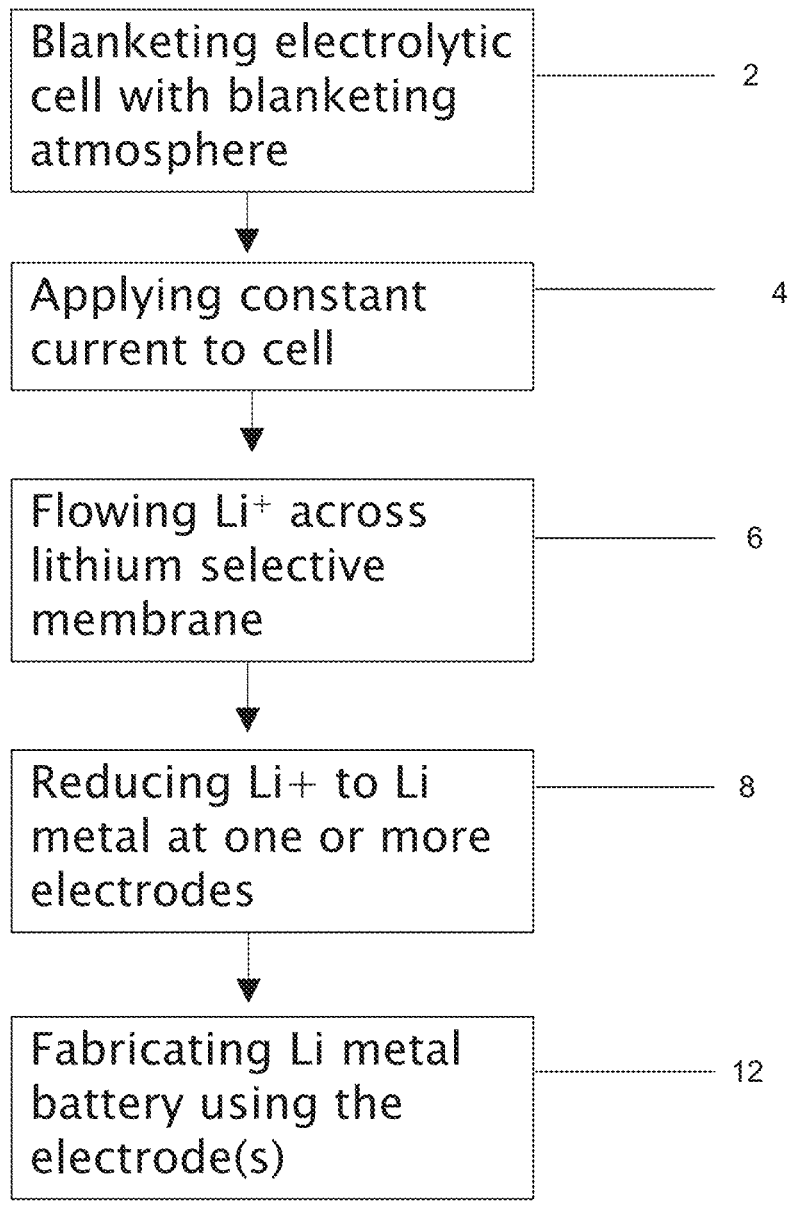
FIG. 1 shows steps in manufacturing a lithium metal battery according to an embodiment of the invention.

FIG. 1 shows steps in manufacturing a lithium metal battery (LMB) according to embodiments of the current invention. An electrolytic cell, such as in the embodiments of FIGS. 2, 4, 6, 7, 9, and 10 is blanketed with blanketing atmosphere 2, the blanketing atmosphere being substantially free of lithium reactive components, including nitrogen, oxygen, ozone, oxides of nitrogen, sulfur and phosphorous, carbon dioxide, halogens, hydrogen halides, and water. In some embodiments, the blanketing atmosphere includes no more than 10 ppm of lithium reactive components on a molar basis. In some embodiments, the blanketing atmosphere includes no more than 5 ppm of lithium reactive components on a molar basis. In preferred embodiments, the blanketing atmosphere contains no more than 10 ppm nitrogen on a molar basis. In preferred embodiments, the blanketing atmosphere contains no more than 5 ppm nitrogen on a molar basis. In preferred embodiments, the blanketing atmosphere contains no more than 1 ppm nitrogen on a molar basis. In preferred embodiments, the blanketing atmosphere is argon gas. In preferred embodiments, the argon gas has a purity of greater than 99.998 weight percent. The electrolytic cell operates at or near room temperature, and uses an aqueous lithium salt solution as an anolyte providing a lithium feed for electrodepositing to form a negative electrode. In preferred embodiments, the aqueous lithium salt solution includes lithium sulfate ($Li_2SO_4$) and/or lithium carbonate ($Li_2CO_3$). When a $Li_2SO_4$ solution is used as feed, the only byproduct is 02 gas which is generated at the anode, vented from the anolyte, and does not come into contact with the inert catholyte area. $Li_2SO_4$ is a lithium feedstock that is very low in the process chain, and thus $Li_2SO_4$ solutions provide an economical source of lithium ions for methods according to the instant invention. When $Li_2CO_3$ is used as feedstock, the minimal amount of carbon dioxide generated can likewise be vented off at the anode of the electrolysis cell. Typically, $Li_2CO_3$ is more expensive than $Li_2SO_4$. However, it is not uncommon for battery manufacturers to receive lithium carbonate that fails to meet quality control standards, and such lithium carbonate could be easily repurposed for lithium metal production. The aqueous lithium salt solutions do not need to be highly concentrated since as lithium ions are depleted by electrodeposition, flow cells may allow depleted lithium ions to be replaced.

Voltage across the electrolytic cell is regulated in order to apply a constant current to the cell 4. The applied voltage causes lithium ions to flow across a lithium ion-selective membrane from the anolyte to a catholyte 6, wherein the lithium ion-selective membrane is configured to allow the passage of lithium ion but to preclude the passage of other chemical species. At the cathode, lithium ion is reduced to the lithium metal, thereby plating onto a conductive substrate, and forming a lithium metal electrode 8. In some embodiments the conductive substrate is selected from the group consisting of copper, aluminum, graphite coated copper, and nickel. In a preferred embodiment, the conductive substrate is copper. When constant current is applied within the range of about 10 $mA/cm^2$ to about 50 $mA/cm^2$, the lithium ions crossing the lithium ion selective membrane and electrodepositing onto a conductive substrate do not produce nanorods or dendrites. Rather, current within this range produces an extremely dense lithium metal deposit and allows electrodeposition to proceed to completion in between one and 60 minutes. In preferred embodiments, the constant current applied is about 10 $mA/cm^2$ to about 50 $mA/cm^2$. In preferred embodiments, the constant current applied is about 25 $mA/cm^2$ to about 50 $mA/cm^2$. In preferred embodiments, the constant current applied is about 40 $mA/cm^2$ to about 50 $mA/cm^2$. In preferred embodiments, the density of the lithium metal deposited ranges from about 0.4 $g/cm^3$ to 0.543 $g/cm^3$. In some preferred embodiments the density of lithium metal deposited ranges from 0.45 $g/cm^3$ to 0.543 $g/cm^3$. A constant current of about 10 $mA/cm^2$ to about 50 $mA/cm^2$ is substantially higher than the operating current during charge/discharge cycles of operating batteries manufactured using lithium metal electrodes of the invention. Lithium metal electrodes formed at higher current densities than are used in an operating battery enhance the charge-discharge recycling capacity of such batteries. Without being bound by theory, it is believed that lithium metal electrodes formed at higher current densities than are used in an operating battery will not form dendrites upon cycling if there are no impurities elsewhere in the battery. During the electrodeposition process, lithium continually passes through a lithium ion selective membrane and accumulates on the conductive substrate until the desired thickness is achieved (a film of 15 µm can be made in under five minutes). Only lithium ions pass through from the lithium ion containing aqueous electrolyte, allowing for the use of inexpensive impure feed solutions containing $Li_2SO_4$. and/or $Li_2CO_3$. The lithium electrodeposited on the negative electrode is elementally pure and remains so because it is never handled or exposed to air prior to entering a battery. Because the electrodepositing occurs in a blanketing atmosphere substantially free of lithium-reactive components, including nitrogen, the formation of impurities, including in particular $Li_3N$, is avoided.

In some embodiments, the lithium electrodeposited on the negative electrode coats all sides of the negative electrode. In some embodiments, the copper is in the form of a mesh. In some embodiments, the copper is in the form of a foam. In some embodiments, the conductive substrate comprises a plate with two faces, and lithium metal coats at least one face of the plate. In some embodiments, the lithium metal coats both of the two faces of the plate.

In some embodiments, the lithium ion selective membrane is a hybrid organic-inorganic membrane including a polymeric matrix and a plurality of ion-conducting particles disposed within the polymeric matrix. In some such embodiments, an inorganic coating is deposited on the polymeric matrix, the inorganic coating being a uniform layer of 1 to 10,000 atoms thick. In some embodiments, the polymer may be a silica-based polyurethane, polyethylene oxide, polystyrene, or polyamide.

In some embodiments, the lithium ion selective membrane comprises a glass frit with lithium ion conducting particles disposed within.

In some embodiments, the ion conducting particles are selected from the group consisting of $LiFePO_4$, $LiCoO_2$, NASICON electrolytes, lithium-lanthanum titanates (LLTO), garnet type electrolytes, LISICON and Thio-LISICON electrolytes, $Li_7La_3Zr_3O_{12}$ (LLZO), the cubic phase (c-LLZO).

Finally, the lithium electrode thus formed is used in the fabrication of a LMB 12. In a preferred embodiment, all of the steps in the manufacturing method are performed at a single manufacturing facility. In some embodiments, the single manufacturing facility is contained in an area of no greater than 10 km². In some embodiments the manufacturing facility is contained in an area less than about 1 km². Because lithium metal batteries of the instant invention are fabricated in a fully charged state, the invention reduces the footprint, cost and time of rechargeable batteries compared to conventional LIBs, which are initially fabricated in an uncharged state, and require time-consuming finishing steps to obtain a fully charged battery.

Figure 2:
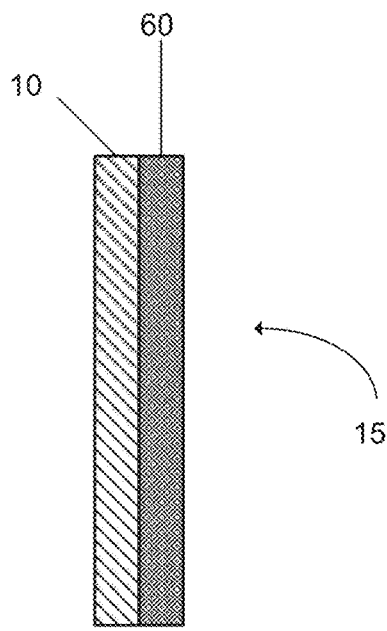
FIG. 2 shows an improved, single-sided lithium metal electrode, suitable for use as a working anode of a lithium metal battery, according to an embodiment of the invention.

FIG. 2 provides a single-sided lithium metal electrode 15 according to an embodiment of the invention. The electrode 15 includes a conductive substrate 10, in the form of a plate having two faces. In preferred embodiments, the conductive substrate is selected from the group consisting of copper, aluminum, graphite coated copper, and nickel. Bonded to one of the two faces of the conductive substrate is a layer of lithium metal 60, the lithium metal including no more than 5 ppm of non-metallic elements by mass. In a preferred embodiment, the lithium metal includes no more than 1 ppm of non-metallic elements by mass. In a preferred embodiment, the lithium metal includes no more than 1 ppm of nitrogen by mass. In a preferred embodiment, the layer of lithium metal 60 has a thickness between about 1 micron and about 10 microns. The conductive substrate 10 and the layer of lithium metal 60 together comprise the single-sided lithium metal electrode 15, suitable for use as a fully charged working anode in a LMB. In a preferred embodiment, the lithium metal electrode 15 has a specific capacity of greater than about 3800 mAh per gram of lithium metal. In a preferred embodiment, the layer of lithium metal 60 has a density of between about 0.4 g/cm³ and about 0.534 g/cm³. In a preferred embodiment, the layer of lithium metal 60 has a density of between about 0.45 g/cm³ and about 0.543 g/cm³.

Figure 3:
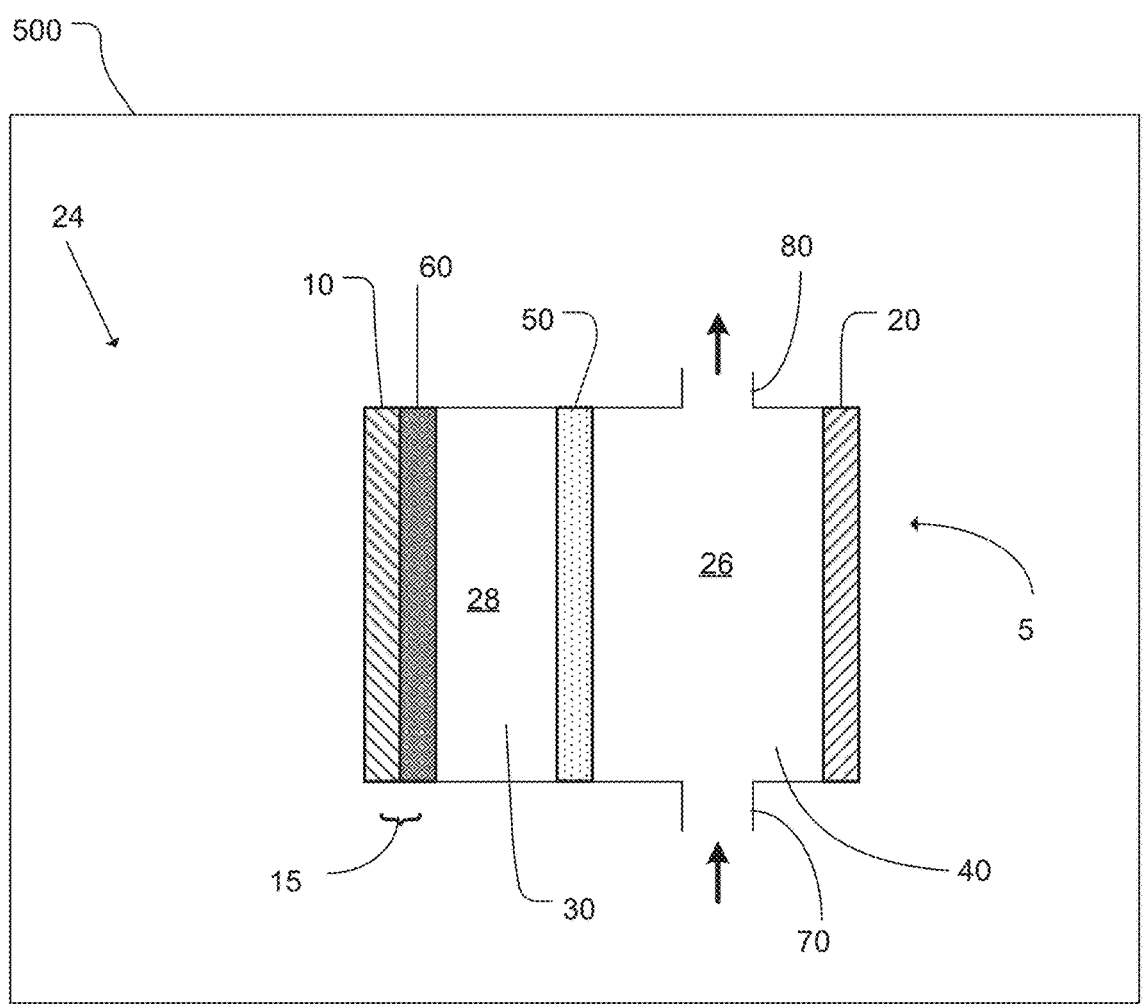
FIG. 3 shows an electrolytic cell for manufacturing an improved, single-sided lithium metal electrode suitable for use as a working anode in a lithium metal battery, according to an embodiment of the invention.

In a method of manufacturing the single-sided lithium electrode 15 shown in FIG. 2, an electrolytic cell 5 is used, as shown in FIG. 3. During the manufacturing process, the electrolytic cell 5 of this embodiment is completely blanketed with a blanketing atmosphere 24, the blanketing atmosphere being substantially free of lithium reactive components. In a preferred embodiment, the blanketing atmosphere includes no more than 10 ppm of lithium reactive components on a molar basis. In a preferred embodiment, the blanketing atmosphere includes no more than 5 ppm of lithium reactive components on a molar basis. In a preferred embodiment, the blanketing atmosphere includes no more than 10 ppm of nitrogen on a per molar basis. In a preferred embodiment, the blanketing atmosphere includes no more than 5 ppm of nitrogen on a per molar basis. In a preferred embodiment, the blanketing atmosphere includes no more than 1 ppm of nitrogen on a per molar basis. In a preferred environment, the blanketing atmosphere comprises argon with a purity of greater than 99.998 weight percent. In the embodiment of FIG. 3, the blanketing atmosphere 24 and the electrolytic cell 5 are enclosed in a gas-impermeable container 500. The cell 5 includes a first chamber 26 and a second chamber 28. The first chamber 26 contains a positive electrode 20 and an aqueous lithium salt solution 40 in contact with the positive electrode 20. The second chamber 28 contains the lithium metal electrode 15, a lithium ion-selective membrane 50, and a non-aqueous electrolyte 30. The lithium ion selective membrane 50 has a first side and a second side, and physically separates the first chamber 26 from the second chamber 28, contacting the aqueous lithium salt solution 40 on the first side. In the second chamber 28, the non-aqueous electrolyte 30 is disposed between the lithium metal electrode 15 and the second side of the lithium ion-selective membrane 50, physically contacting both the lithium metal electrode 15 and the second side of the lithium ion-selective membrane 50. The lithium metal electrode 15 includes a conductive substrate 10, stationary during lithium metal electrodeposition within the second chamber, electrodeposited with a layer of elemental lithium 60. The lithium ion selective membrane 50 allows lithium ions to pass between the first chamber 26 and the second chamber 28, but precludes the passage of other chemical species between the two chambers. In particular, the lithium ion selective membrane does not allow water to pass from the first chamber 26 to the second chamber 28.

In manufacturing the single-sided lithium metal electrode 15 embodied in FIG. 2, a variable voltage is applied across the positive electrode 20 and the conductive substrate 10 of the electrolytic cell 5, in order to maintain a constant current, thereby causing lithium ions to move through the aqueous lithium salt solution 40, cross from the first chamber 26 to the second chamber 28, through the lithium ion selective membrane 50, into the non-aqueous electrolyte, travel to the surface of the stationary conductive substrate 10, where each lithium ion gains an electron, thereby causing the layer of elemental lithium 60 to be electrodeposited on the conductive substrate 10, thereby forming the single-sided lithium metal electrode 15.

In some embodiments, the first chamber 26 of the electrolytic cell 5 of FIG. 2 is a flow chamber, with an entrance port 70 and an exit port 80 allowing aqueous lithium salt solution to enter the first chamber 26 to provide a renewable supply of lithium ions for electrodepositing.

In preferred embodiments, the constant current is between about 10 mA/cm² and about 50 mA/cm². In preferred embodiments, the constant current applied is about 25 mA/cm² to about 50 mA/cm². In preferred embodiments, the constant current applied is about 40 mA/cm² to about 50 mA/cm². In preferred embodiments, the constant current is applied for a time between about 1 minute and about 60 minutes.

In preferred embodiments, the aqueous lithium salt solution 40 is selected from the group consisting of $Li_2SO_4$, $Li_2CO_3$, and combinations thereof. In preferred embodiments, the aqueous lithium salt solution 40 includes $Li_2SO_4$. In preferred embodiments, the lithium ion selective membrane 50 comprises a polymeric matrix and a plurality of ion-conducting particles disposed within the polymeric matrix. In a preferred embodiment, the lithium ion selective membrane 50 includes a glass frit with lithium ion conducting particles disposed within.

Figure 4:
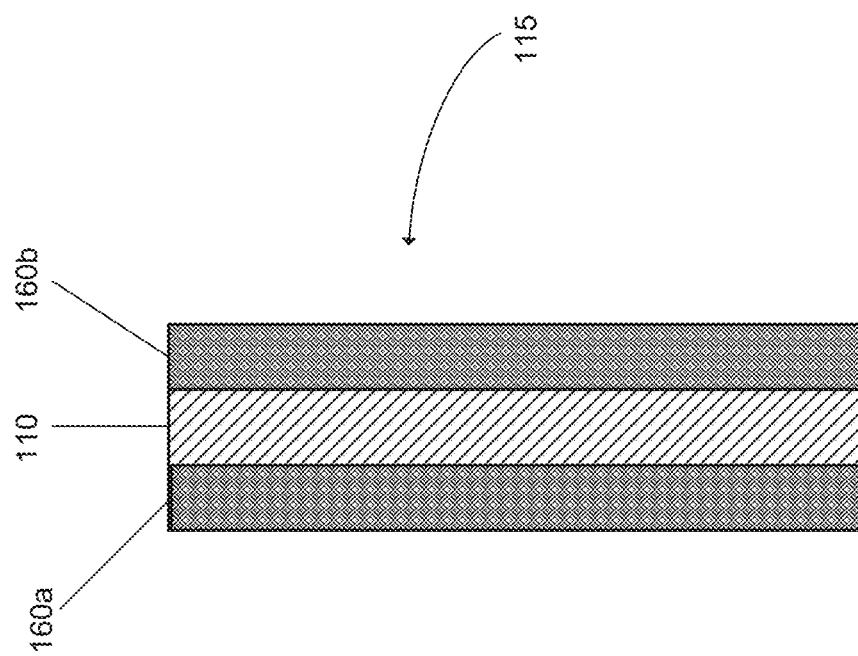
FIG. 4 shows an improved, double-sided lithium electrode, suitable for use as a working anode in a lithium metal battery, according to an embodiment of the invention.

FIG. 4 provides a double-sided lithium metal electrode, according to an embodiment of the invention. The double-sided lithium metal electrode 115 includes a conductive substrate 110, in the form of a plate having a first face and a second face. In preferred embodiments, the conductive substrate 115 is selected from the group consisting of copper, aluminum, graphite coated copper, and nickel. The first face and a second face of the conductive substrate 115 are coated with a layer of lithium metal, 160a and 160b, respectively, the lithium metal including no more than 5 ppm of non-metallic elements by mass. In a preferred embodiment, the lithium metal includes no more than 1 ppm of non-metallic elements by mass. In a preferred embodiment, the layer of lithium metal 160a, 160b has a thickness between about 1 micron and about 10 microns. The conductive substrate 110 and the layers of lithium metal 160a and 160b together comprise the double-sided lithium metal electrode 115, which is suitable for use as a fully charged working anode in a LMB. In a preferred embodiment, the lithium metal electrode 115 has a specific capacity of greater than about 3800 mAh per gram of lithium metal. In a preferred embodiment, the layers of lithium metal 160a, 160b each have a density of between about 0.4 g/cm$^3$ and about 0.543 g/cm$^3$. In a preferred embodiment, the layers of lithium metal 160a, 160b each have a density of between about 0.45 g/cm$^3$ and about 0.543 g/cm$^3$.

Figure 5:
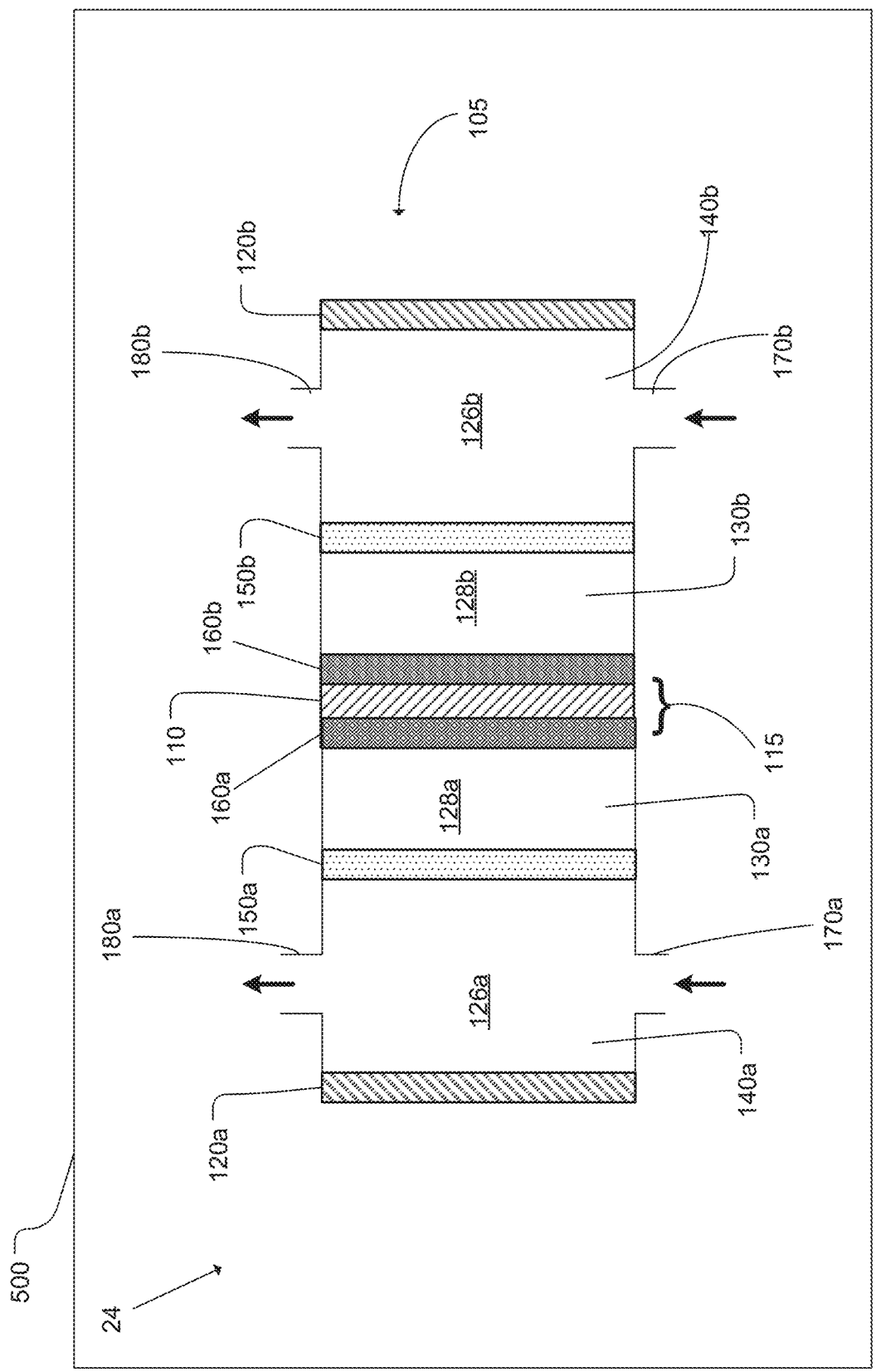
FIG. 5 shows an electrolytic cell suitable for manufacturing a double-sided electrode suitable for use as a working anode in a lithium metal battery, according to an embodiment of the invention.

In a method of manufacturing the double-sided lithium electrode 115 shown in FIG. 4, an electrolytic cell 105 is used, as shown in FIG. 5. During the manufacturing process, the electrolytic cell 105 of this embodiment is blanketed with a blanketing atmosphere 24, the blanketing atmosphere 24 being inert to chemical reaction with lithium. In a preferred embodiment, the blanketing atmosphere includes no more than 10 ppm of lithium reactive components on a molar basis. In a preferred embodiment, the blanketing atmosphere includes no more than 5 ppm of lithium reactive components on a molar basis. In a preferred embodiment, the blanketing atmosphere includes no more than 10 ppm of nitrogen on a per molar basis. In a preferred embodiment, the blanketing atmosphere includes no more than 5 ppm of nitrogen on a per molar basis. In a preferred embodiment, the blanketing atmosphere includes no more than 1 ppm of nitrogen on a per molar basis. In a preferred environment, the blanketing atmosphere comprises argon with a purity of greater than 99.998 weight percent. In the embodiment of FIG. 5, the blanketing atmosphere 24 and the electrolytic cell 105 are enclosed in a gas-impermeable container 500. The cell 105 includes a first chamber 126a, a second chamber 128a, a third chamber 126b, and a fourth chamber 128b. The first chamber 126a contains a positive electrode 120a and an aqueous lithium salt solution 140a in contact with the positive electrode 120a and the third chamber 126b contains a positive electrode 120b and an aqueous lithium salt solution 140b in contact with the positive electrode 120b. The second chamber 128a and the fourth chamber 128b share the double-sided lithium metal electrode 115, which bounds the two chambers, the double-sided lithium metal electrode 115 including a central conductive substrate 110 having a first face and a second face, the first and the second faces electrodeposited with the layers of lithium metal 160a, 160b, respectively, with the layer of lithium metal 160a extending into the second chamber 128a, and the layer of lithium metal 160b extending into the fourth chamber. The second chamber 128a contains a lithium ion-selective membrane 150a, and a non-aqueous electrolyte 130a. The lithium ion selective membrane 150a has a first side and a second side, and physically separates the first chamber 126a from the second chamber 128a, contacting the aqueous lithium salt solution 140a on the first side. In the second chamber 128a, the non-aqueous electrolyte 130a is disposed between the lithium metal layer 160a and the second side of the lithium ion-selective membrane 150a. The fourth chamber contains a lithium ion-selective membrane 150b, and a non-aqueous electrolyte 130b. The lithium ion selective membrane 150b has a first side and a second side, and physically separates the third chamber 126b from the fourth chamber 128b, contacting the aqueous lithium salt solution 140b on the first side. In the fourth chamber 128b, the non-aqueous electrolyte 130b is disposed between the lithium metal layer 160b and the second side of the lithium ion-selective membrane 150b. The lithium ion selective membranes 150a, 150b allow lithium ions to pass between first chamber 126a and the second chamber 128a, and between the third chamber 126b and the fourth chamber 128b, respectively, but preclude the passage of other chemical species between the first and second chambers 126a, 128a and between the third and the fourth chambers 126b, 128b, respectively.

In manufacturing the double-sided lithium metal electrode 115 embodied in FIG. 4 using the electrolytic cell 105, a variable voltage is applied across the positive electrodes 120a, 120b and the conductive substrate 110 of the electrolytic cell 105, in order to maintain a constant current, thereby causing lithium ions to move through the aqueous lithium salt solutions 140a, 140b, cross from the first and third chambers 126a, 126b to the second and fourth chambers 128a, 128b, respectively, through the respective lithium ion selective membranes 150a, 150b, and into the non-aqueous electrolytes 130a, 130b, respectively, travel to the first and second faces of the conductive substrate, where each lithium ion gains an electron, thereby causing layers of elemental lithium 160a, 160b to be electrodeposited, respectively, on the first face and the second face of the conductive substrate 110, thereby forming the double-sided lithium metal electrode 115. During electrodeposition of the lithium metal layers 160a, 160b onto the first face and the second face of the conductive substrate 110, the conductive substrate 110 remains stationary.

In some embodiments, the first and third chambers 126a, 126b of the electrolytic cell 105 of FIG. 4 are flow chambers, with entrance ports 170a, 170b and exit ports 180a, 180b allowing aqueous lithium salt solutions 140a, 140b to enter the first chamber 126a and the third chamber 126b to provide a renewable supply of lithium ions for electrodepositing.

In preferred embodiments, the constant current is between about 10 mA/cm$^2$ and about 50 mA/cm$^2$. In preferred embodiments, the constant current applied is about 25 mA/cm$^2$ to about 50 mA/cm$^2$. In preferred embodiments, the constant current applied is about 40 mA/cm$^2$ to about 50 mA/cm$^2$. In preferred embodiments, the constant current is applied for a time between about 1 minute and about 60 minutes.

In preferred embodiments, the aqueous lithium salt solution 140a, 140b is selected from the group consisting of $Li_2SO_4$, $Li_2CO_3$, and combinations thereof. In preferred embodiments, the aqueous lithium salt solution 140a, 140b includes $Li_2SO_4$. In preferred embodiments, the lithium ion selective membrane 150a, 150b comprises a polymeric matrix and a plurality of ion-conducting particles disposed within the polymeric matrix. In a preferred embodiment, the lithium ion selective membrane 150a, 150b includes a glass frit with lithium ion conducting particles disposed within.

Figure 6:
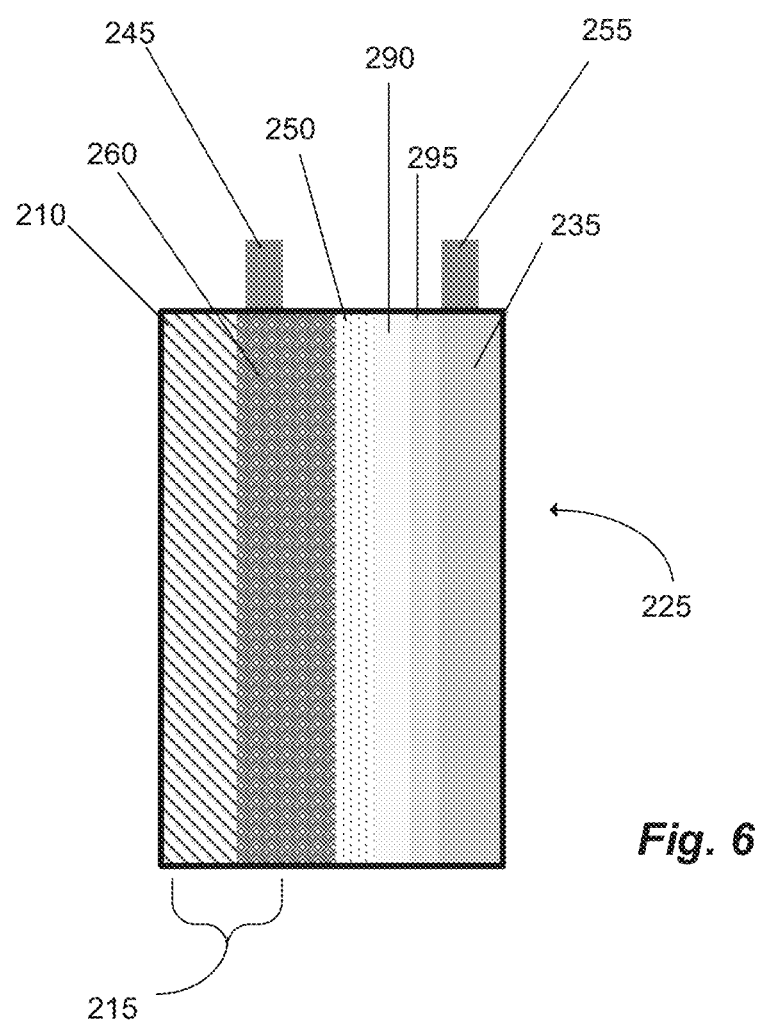
FIG. 6 shows a battery having as a working anode a single-sided lithium metal electrode, with a layer of highly pure lithium metal sandwiched between a conductive substrate and a lithium ion selective membrane, the lithium ion selective membrane configured to function as a solid state electrolyte.

FIG. 6 provides a galvanic cell 225 manufactured with a single-sided lithium metal electrode 215 configured to function as an anode. The lithium metal electrode 215 includes a conductive substrate 210, bonded to a layer of lithium metal 260, the lithium metal including no more than 5 ppm of non-metallic elements by mass. In a preferred embodiment, the lithium metal includes no more than 1 ppm of non-metallic elements by mass. In a preferred embodiment, the lithium metal includes no more than 1 ppm of nitrogen by mass. The conductive substrate 210 and the layer of lithium metal 260 together comprise the single-sided lithium metal electrode 215, of the galvanic cell 225. In a preferred embodiment, the lithium metal electrode 215 has a specific capacity of greater than about 3800 mAh per gram of lithium metal. In a preferred embodiment, the layer of lithium metal 60 has a density of between about 0.4 g/cm$^3$ and about 0.534 g/cm$^3$. In a preferred embodiment, the layer of lithium metal 260 has a density of between about 0.45 g/cm$^3$ and about 0.543 g/cm$^3$. In preferred embodiments, the conductive substrate is selected from the group consisting of copper, aluminum, graphite coated copper, and nickel. The layer of lithium metal 260 has a first face and a second face and is bonded on the first face to the conductive substrate 210 and on the second face to the lithium ion-selective membrane 250. The lithium ion-selective membrane 250, is configured to function as a solid state electrolyte. The lithium ion-selective membrane 250 separates the layer of lithium metal 260 from a catholyte 290. In preferred embodiments, the catholyte 290 includes ionic liquid-forming salts. In preferred embodiments, the catholyte 290 comprises an ionic liquid. The catholyte 290 in turn separates the lithium ion-selective membrane 250 from a cathode/catholyte interface 295, which covers a face of a cathode 235, separating the cathode 235 from the catholyte 290. Electrical contacts to the anode 245 allow electrons to flow from the electrode 215 to corresponding electrical contacts to the cathode 255, and then on to the cathode 235. In this configuration, the lithium ion-selective membrane 250 is configured to function as a solid state electrolyte. During discharge of the battery, the layer of pure lithium metal is oxidized to lithium ions, releasing electrons which flow through the electrical contacts 245, 255 from the single-sided electrode 215 to the cathode 235, and lithium ions, which flow through the lithium ion-selective membrane 250 into the catholyte 290, and into the cathode 235, where electrons are taken up. In various embodiments, the catholyte 290 can include an organic cation and an inorganic ion, comprising a salt capable of forming an ionic liquid. In embodiments, the catholyte 290 comprises an ionic liquid. In embodiments, the catholyte 290 comprises lithium salts of an organic anion capable of forming ionic liquids, the organic anions selected from the group consisting of trifluoromethanesulfonyl-imide (TFSI), N-butyl-N-methylpyrrolidinium bis(trifluoromethanesulfonyl)imide (Pyr$_{14}$TFSI), trifluoromethanesulfonyl-imide, bis(trifluoromethanesulfonyl)imide (LiTFSI), and 1-ethyl-3-methylimidazolium-bis(trifluoromethylsulfonyl) imide (EMI-TFSI). In some embodiments, the catholyte 290 comprises ionic liquid-forming salts dissolved in 1,3-dioxolane (DOL), 1,2 dimethoxyethane (DME), or tetraethylene glycol dimethyl ether (TEGDME). In an embodiment, the catholyte comprises concentrated (4.0-5.0 M) lithium bis (fluorosulfonyl) imide (LiFSI) in 1:1 DOL/DME.

Without being bound by theory, it is believed that elementally pure lithium metal chemically bonded to a substrate which is then chemically bonded to a lithium ion selective membrane configured to function as a solid state electrolyte will eliminate impedance variations at the electrode/solid electrolyte separator interface, thereby minimizing dendrite formation.

Figure 7:
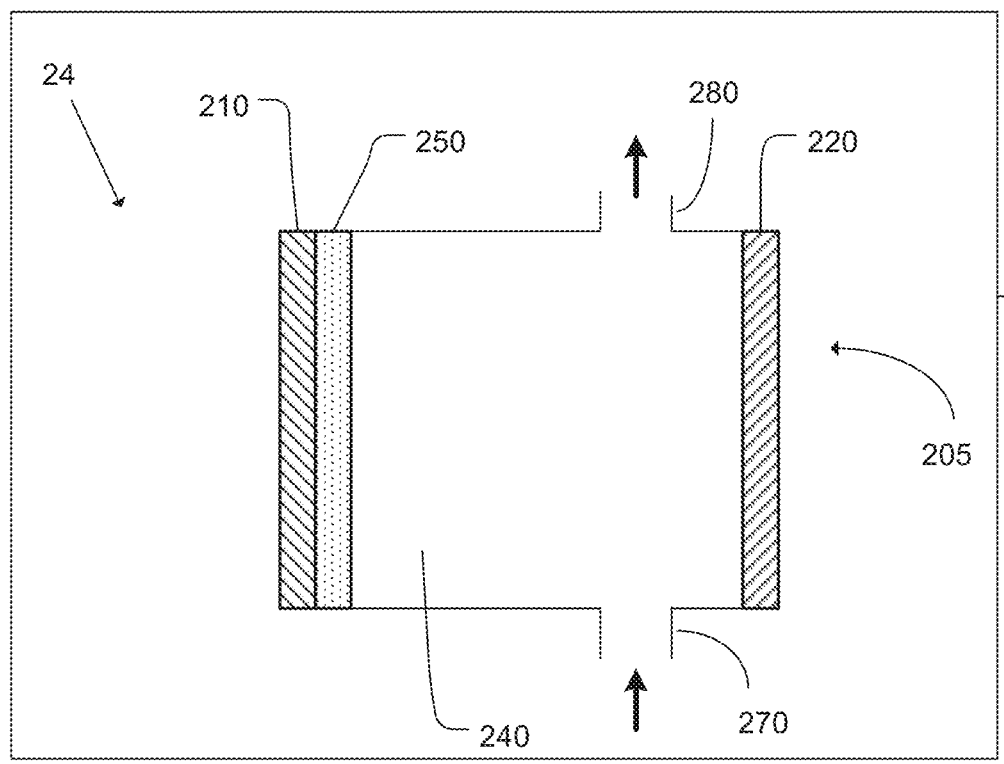
FIG. 7 shows an electrolytic cell suitable for manufacturing a single-sided lithium metal electrode as shown in FIG. 6, prior the plating of lithium metal on a conductive substrate of the cell, with a conductive substrate coated with a lithium ion selective membrane.
Figure 8:
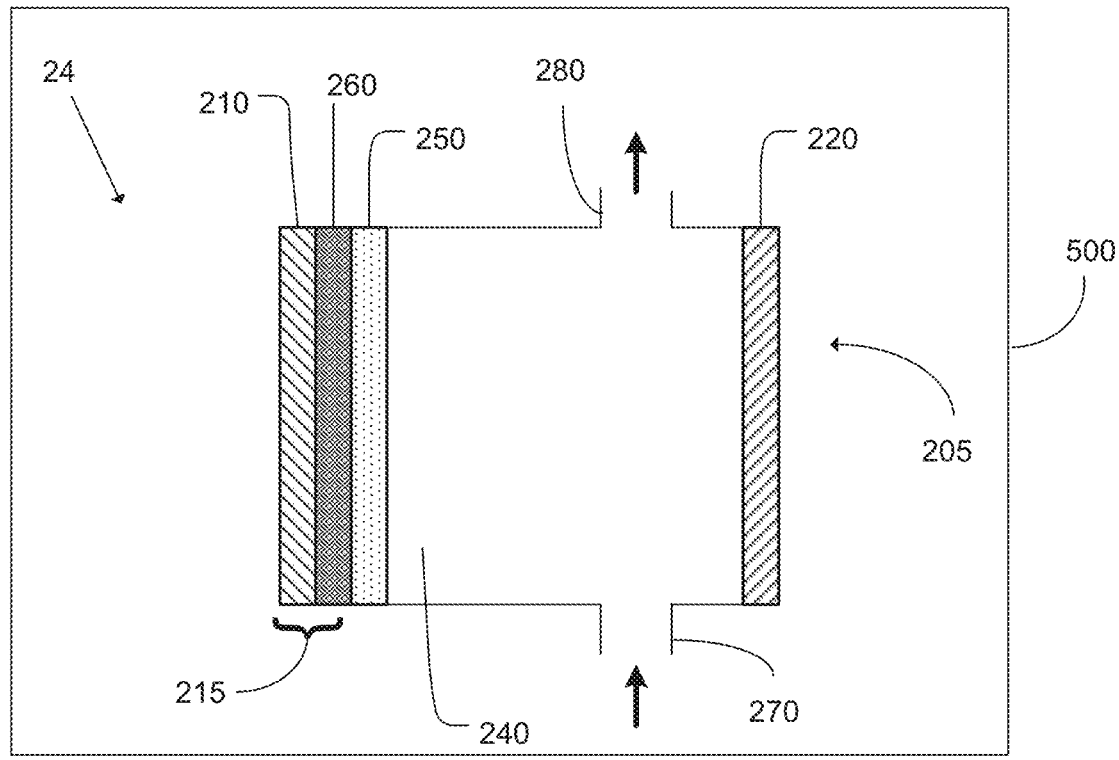
FIG. 8 shows the electrolytic cell of FIG. 7, after plating of lithium metal on the conductive substrate, the lithium metal being bonded on one side to the conductive substrate, and on the opposite side to the solid-state electrolyte, the electrode being suitable for use as a working anode in a lithium metal battery, according to an embodiment of the invention.

In a method of manufacturing by electrodeposition the single-sided lithium electrode 215 of the galvanic cell 225 of FIG. 6, an electrolytic cell 205 is used. FIG. 7 shows the electrolytic cell 205 prior to electrodeposition and FIG. 8 shows the electrolytic cell following electrodeposition. According to the method, the electrolytic cell 205 is completely blanketed with a blanketing atmosphere 24, the blanketing atmosphere being inert to chemical reaction with lithium. In a preferred embodiment, the blanketing atmosphere includes no more than 10 ppm of lithium reactive components on a molar basis. In a preferred embodiment, the blanketing atmosphere includes no more than 5 ppm of lithium reactive components on a molar basis. In a preferred embodiment, the blanketing atmosphere includes no more than 10 ppm of nitrogen on a per molar basis. In a preferred embodiment, the blanketing atmosphere includes no more than 5 ppm of nitrogen on a per molar basis. In a preferred embodiment, the blanketing atmosphere includes no more than 1 ppm of nitrogen on a per molar basis. In a preferred environment, the blanketing atmosphere comprises argon with a purity of greater than 99.998 weight percent. In the embodiment of FIGS. 7 and 8, the blanketing atmosphere 24 and the electrolytic cell 5 are enclosed in a gas-impermeable container 500. During the process of electrodeposition, the electrolytic cell 205 is confined to the blanketing atmosphere 24.

The electrolytic cell 205 includes a conductive substrate 210, configured as a negative electrode, an ion-selective membrane 250, an aqueous lithium salt solution 240, and a positive electrode 220. The aqueous lithium salt solution 240 is interposed between the conductive substrate 210 and the positive electrode 220. Prior to electrodeposition, as shown in FIG. 7, the lithium ion selective membrane 250 covers the conductive substrate 210, and forms a barrier separating the lithium salt solution 240 and the conductive substrate 210. Prior to electrodeposition, as shown in FIG. 7, the conductive substrate 210 is physically coated with a lithium ion-selective membrane 250, configured to function as a solid state electrolyte. After electrodeposition, as shown in FIG. 8, a layer of lithium metal 260 is electrodeposited between the conductive substrate 210 and the lithium ion selective membrane 250, bonding to both the conductive substrate 210 and to the lithium ion selective membrane 250. During the process of electrodeposition, the lithium ion-selective membrane 250 separates the conductive substrate 210 and the electrodeposited lithium metal layer 260 from the lithium salt solution 240. The lithium ion selective membrane 250 is configured to function as a solid state electrolyte, allowing the passage of lithium ions from the aqueous salt solution 240 to electrodeposit onto the surface of the conductive substrate 210, but precluding the passage of other chemical species.

In manufacturing the single-sided lithium metal electrode 215 for the galvanic cell embodied in FIG. 6, a variable voltage is applied across the positive electrode 220 and the conductive substrate 210 of the electrolytic cell 205, in order to maintain a constant current, thereby causing lithium ions to move through the aqueous lithium salt solution 240, through the lithium ion-selective membrane 250, travel to the surface of the conductive substrate 210, where each lithium ion gains an electron, thereby electrodepositing a layer of elemental lithium 260 onto the conductive substrate 210, the layer of elemental lithium thus forming and bonding to the conductive substrate on a first side of the layer of elemental lithium 260 and the lithium ion-selective membrane 250 on a second side of the layer of elemental lithium 260. In this manner, as shown in FIGS. 7 and 8, the single-sided lithium metal electrode 215 is manufactured so that a sandwich of the layer of lithium metal 260 is formed between the conductive substrate 210 and the lithium ion-selective membrane 250. During the process of electrodeposition, the conductive substrate 210 is stationary in the electrolytic cell.

In some embodiments, the electrolytic cell 205 of FIG. 7 is a flow chamber, with an entrance port 270 and an exit port 280 allowing aqueous lithium salt solution 240 to enter the electrolytic cell 205 to provide a renewable supply of lithium ions for electrodepositing.

In preferred embodiments, the constant current is between about 10 mA/cm$^2$ and about 50 mA/cm$^2$. In preferred embodiments, the constant current applied is about 25 mA/cm$^2$ to about 50 mA/cm$^2$. In preferred embodiments, the constant current applied is about 40 mA/cm$^2$ to about 50 mA/cm$^2$. In preferred embodiments, the constant current is applied for a time between about 1 minute and about 60 minutes.

In preferred embodiments, the aqueous lithium salt solution 240 is selected from the group consisting of $Li_2SO_4$, $Li_2CO_3$, and combinations thereof. In preferred embodiments, the aqueous lithium salt solution 240 includes $Li_2SO_4$. In preferred embodiments, the lithium ion selective membrane 250 comprises a polymeric matrix and a plurality of ion-conducting particles disposed within the polymeric matrix. In a preferred embodiment, the lithium ion selective membrane 250 includes a glass frit with lithium ion conducting particles disposed within.

In an alternative method of manufacturing by electrodeposition the single-sided lithium electrode 215 of the galvanic cell 225 of FIG. 6, the electrolytic cell 5 of FIG. 3 is used. According to this method, the lithium ion selective membrane 50 and the conductive substrate 10 both remain stationary in the electrolytic cell. A variable voltage is applied across the positive electrode 20 and the conductive substrate 10 of the electrolytic cell 5, in order to maintain a constant current, thereby causing lithium ions to move through the aqueous lithium salt solution 40, cross from the first chamber 26 to the second chamber 28, through the lithium ion selective membrane 50, into the non-aqueous electrolyte, travel to the surface of the conductive substrate 10, where each lithium ion gains an electron, thereby causing the layer of elemental lithium 60 to be electrodeposited on the conductive substrate 10. As the layer of elemental lithium 60 grows, it displaces non-aqueous electrolyte 30 from the second chamber 28, eventually coming into contact with and bonding to the lithium ion selective membrane 50, thereby forming the single-sided lithium metal electrode 215 of FIG. 6, comprising the conductive substrate 10 and the layer of lithium 60, wherein the layer of lithium 60 is bonded on one face to the conductive substrate 10 and on the other face to the lithium ion-selective membrane 50, which is configured to function as a solid state electrolyte.

Figure 9:
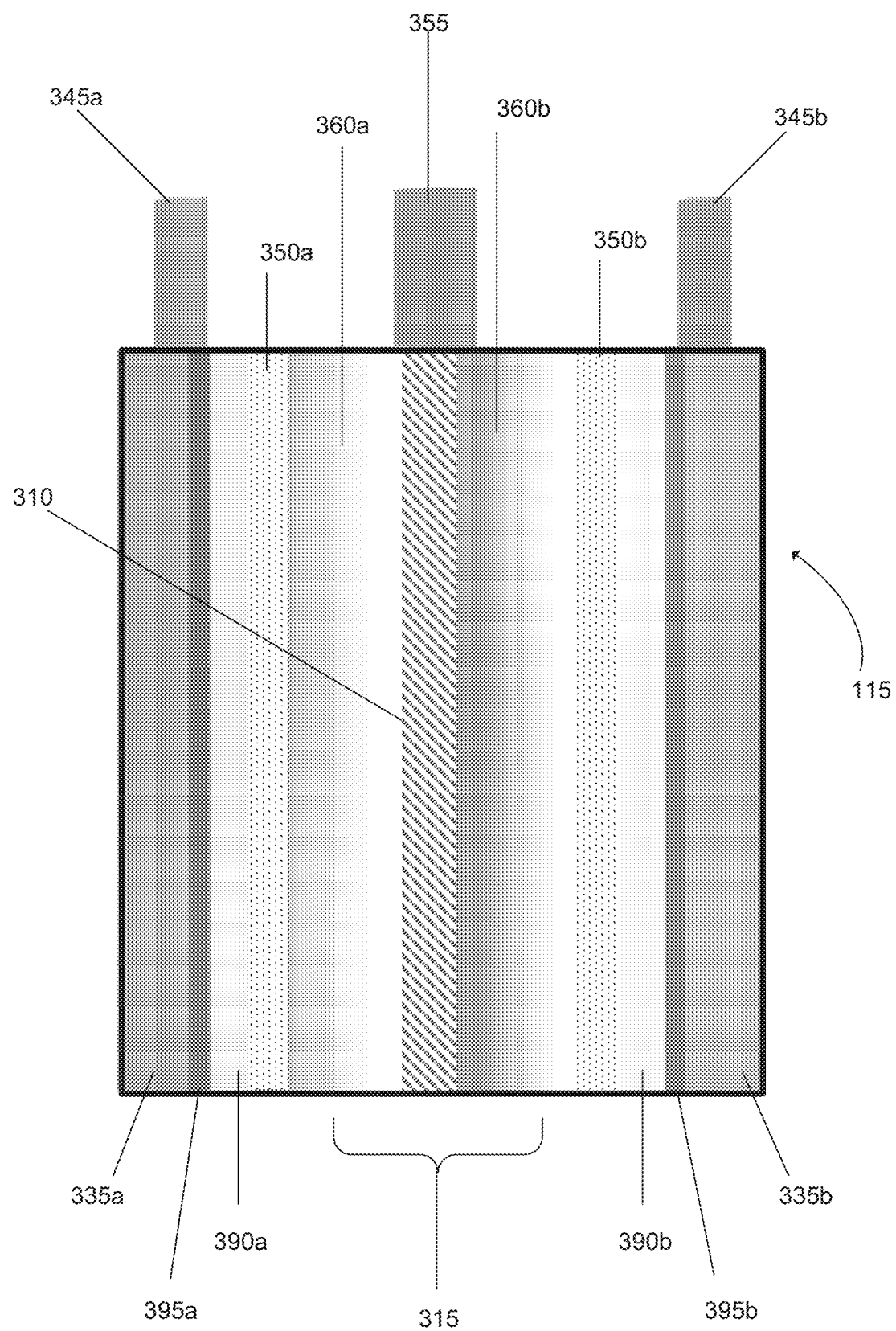
FIG. 9 shows a battery according to an embodiment of the invention, the battery having as a working anode a double-sided lithium electrode, with lithium metal sandwiched between a conductive substrate and a lithium ion selective membrane, the lithium ion selective membrane configured to function as a solid-state electrolyte.

FIG. 9 provides a galvanic cell 325 manufactured with a double-sided lithium metal electrode 315, configured to function as an anode. The double-sided lithium metal electrode 315 includes a conductive substrate 310, in the form of a plate having a first face and a second face, with the first face and the second face bonded to first and second lithium metal sheets, 360a and 360b, respectively, the lithium metal including no more than 5 ppm of non-metallic elements by mass. In a preferred embodiment, the lithium metal includes no more than 1 ppm of non-metallic elements by mass. In a preferred embodiment, the lithium metal includes no more than 1 ppm of nitrogen by mass. The conductive substrate 310 and the first and second layers of lithium metal, 360a, 360b, respectively, together comprise the double-sided lithium metal electrode 315 of the galvanic cell 325. In a preferred embodiment, the lithium metal electrode 315 has a specific capacity of greater than about 3800 mAh per gram of lithium metal. In a preferred embodiment, the first and the second layers of lithium metal 360a, 360b, each has a density of between about 0.4 g/cm$^3$ and about 0.534 g/cm$^3$.

In a preferred embodiment, the layers of lithium metal 360a, 360b, each has a density of between about 0.45 g/cm$^3$ and about 0.543 g/cm$^3$. In preferred embodiments, the conductive substrate is selected from the group consisting of copper, aluminum, graphite coated copper, and nickel. Each layer of lithium metal 360a, 360b has a first face and a second face and is bonded on the first face to the conductive substrate 310 and on the second face to the lithium ion-selective membrane 350a, 350b, respectively. The lithium ion-selective membranes 350a, 350b, are configured to function as solid state electrolytes. The lithium ion-selective membrane 350a separates the layer of lithium metal 360a from a catholyte 390a. In preferred embodiments, the catholyte 390a includes ionic liquid-forming salts. In preferred embodiments, the catholyte 390a comprises an ionic liquid. The catholyte 390a in turn separates the lithium ion-selective membrane 350a from a cathode/catholyte interface 395a, which covers a face of a cathode 335a, separating the cathode 335a from the ionic liquid 390a. The lithium ion-selective membrane 350b separates the layer of lithium metal 360b from a catholyte 390b. In preferred embodiments, the catholyte 390b includes ionic liquid-forming salts. In preferred embodiments, the catholyte 390b comprises an ionic liquid. The catholyte 390b in turn separates the lithium ion-selective membrane 350b from a cathode/catholyte interface 395b, which covers a face of a cathode 335b, separating the cathode 335b from the ionic liquid 390b.

An electrical contact to the anode 345 allows electrons to flow from the electrode 315 to corresponding electrical contacts to the two cathodes 355a, 355b and then on to the cathodes 335a, 335b, respectively. During discharge of the battery, the layers of pure lithium metal 360a, 360b are oxidized to lithium ions, releasing electrons which flow through the electrical contact 345, through the electrical contacts 355a, 355b from the double-sided electrode 315 to the cathodes 335a, 335b and lithium ions, which flow through the lithium ion-selective membranes 350a, 350b into the ionic liquids 390a, 390b, and into the cathodes, 335a, 335b, where they intercalate into the cathodes 335a, 335b where electrons are taken up. In various embodiments, the catholyte can include an organic cation and an inorganic ion, comprising a salt capable of forming an ionic liquid. In various embodiments, the catholytes 390a, 390b can include an organic cation and an inorganic ion, comprising a salt capable of forming an ionic liquid. In embodiments, the catholytes 390a, 390b comprise an ionic liquid. In embodiments, the catholytes 390a, 390b comprise lithium salts of an organic anion capable of forming ionic liquids, the organic anions selected from the group consisting of trifluoromethanesulfonyl-imide (TFSI), N-butyl-N-methylpyrrolidinium bis(trifluoromethanesulfonyl)imide ($Pyr_{14}TFSI$), trifluoromethanesulfonyl-imide, bis(trifluoromethanesulfonyl)imide (LiTFSI), and 1-ethyl-3-methylimidazolium-bis (trifluoromethylsulfonyl)imide (EMI-TFSI). In some embodiments, the catholytes 390a, 390b comprise ionic liquid-forming salts dissolved in 1,3-dioxolane (DOL), 1,2 dimethoxyethane (DME), or tetraethylene glycol dimethyl ether (TEGDME). In an embodiment, the catholytes 390a, 390b comprise concentrated (4.0-5.0 M) lithium bis(fluorosulfonyl) imide (LiFSI) in 1:1 DOL/DME.

Without being bound by theory, it is believed that elementally pure lithium metal chemically bonded to a substrate which is then chemically bonded to a lithium ion selective membrane configured to function as a solid state electrolyte will eliminate impedance variations at the electrode/solid electrolyte separator interface, thereby minimizing dendrite formation.

Figure 10:
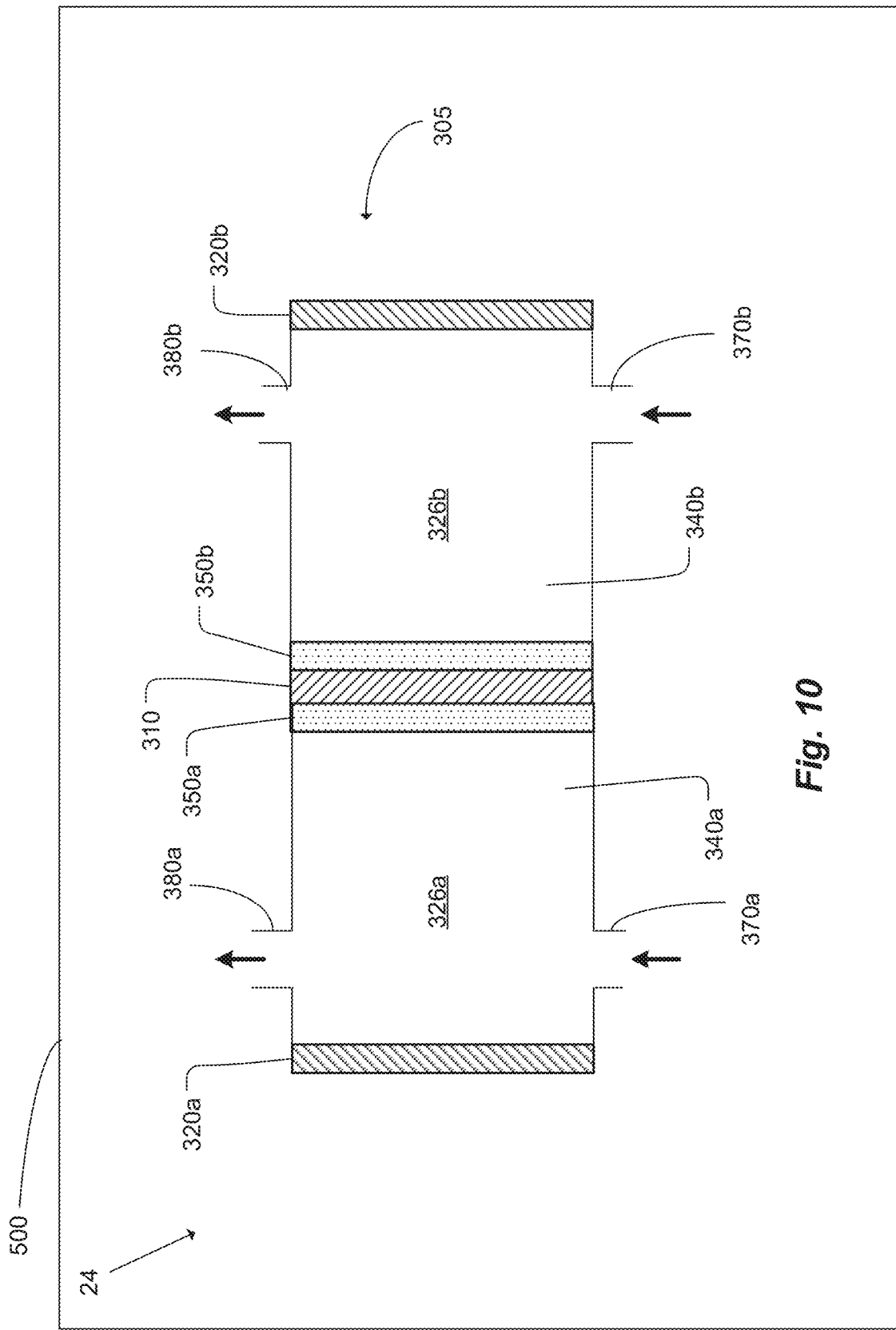
FIG. 10 shows an electrolytic cell suitable for manufacturing a double-sided lithium metal electrode of the type embodied in FIG. 9, prior to the plating of lithium metal on the two sides of the conductive substrate of the cell, wherein the conductive substrate is covered with a lithium ion selective membrane on both of its two faces.
Figure 11:
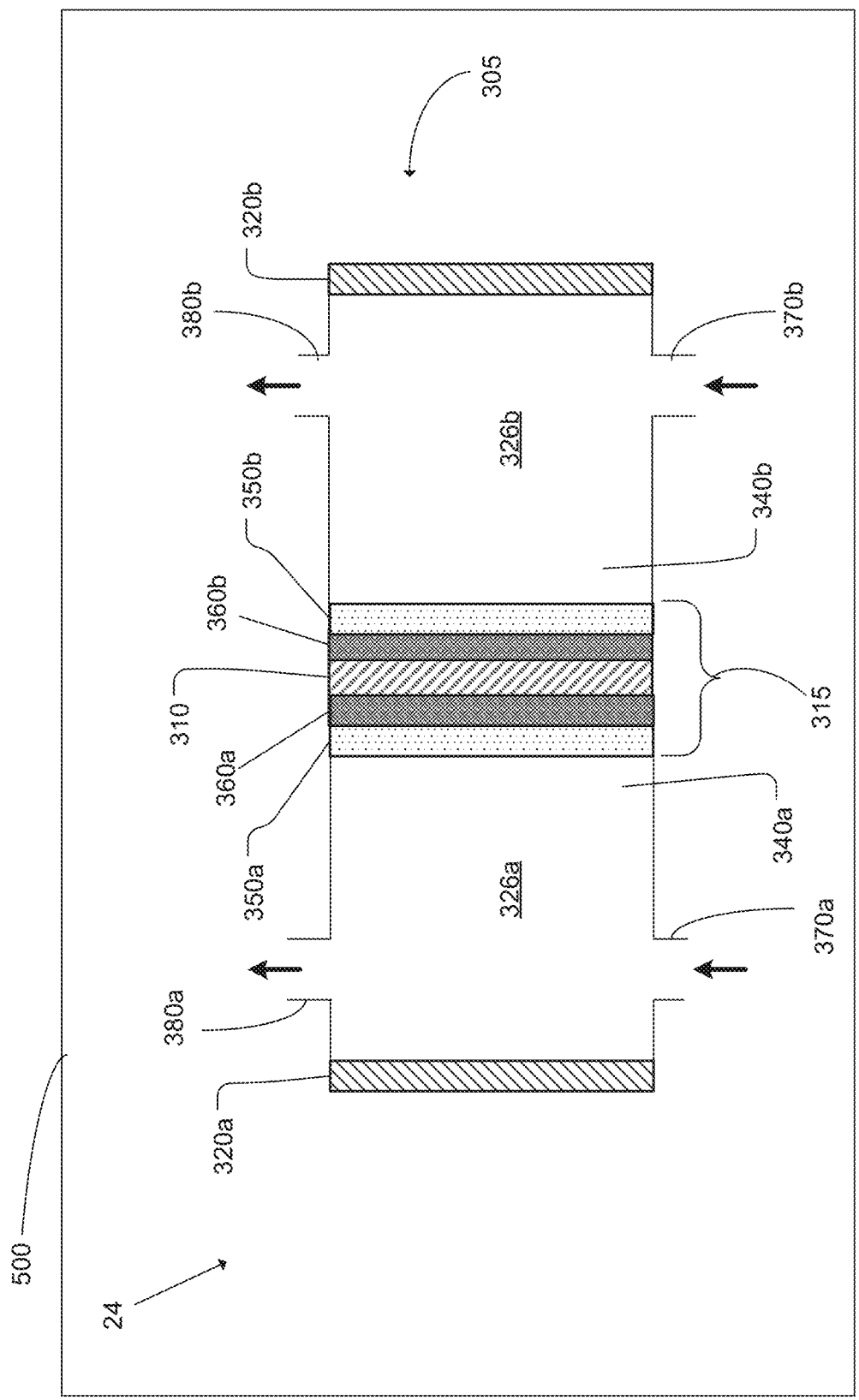
FIG. 11 shows the electrolytic cell of FIG. 10, after plating of lithium metal on each the two faces of a conductive substrate, where for each face, the lithium metal is bonded on one side to the conductive substrate, and on the opposite side to the solid-state electrolyte, the electrode being suitable for use as a working anode in a lithium metal battery, according to an embodiment of the invention.
Figure 12:
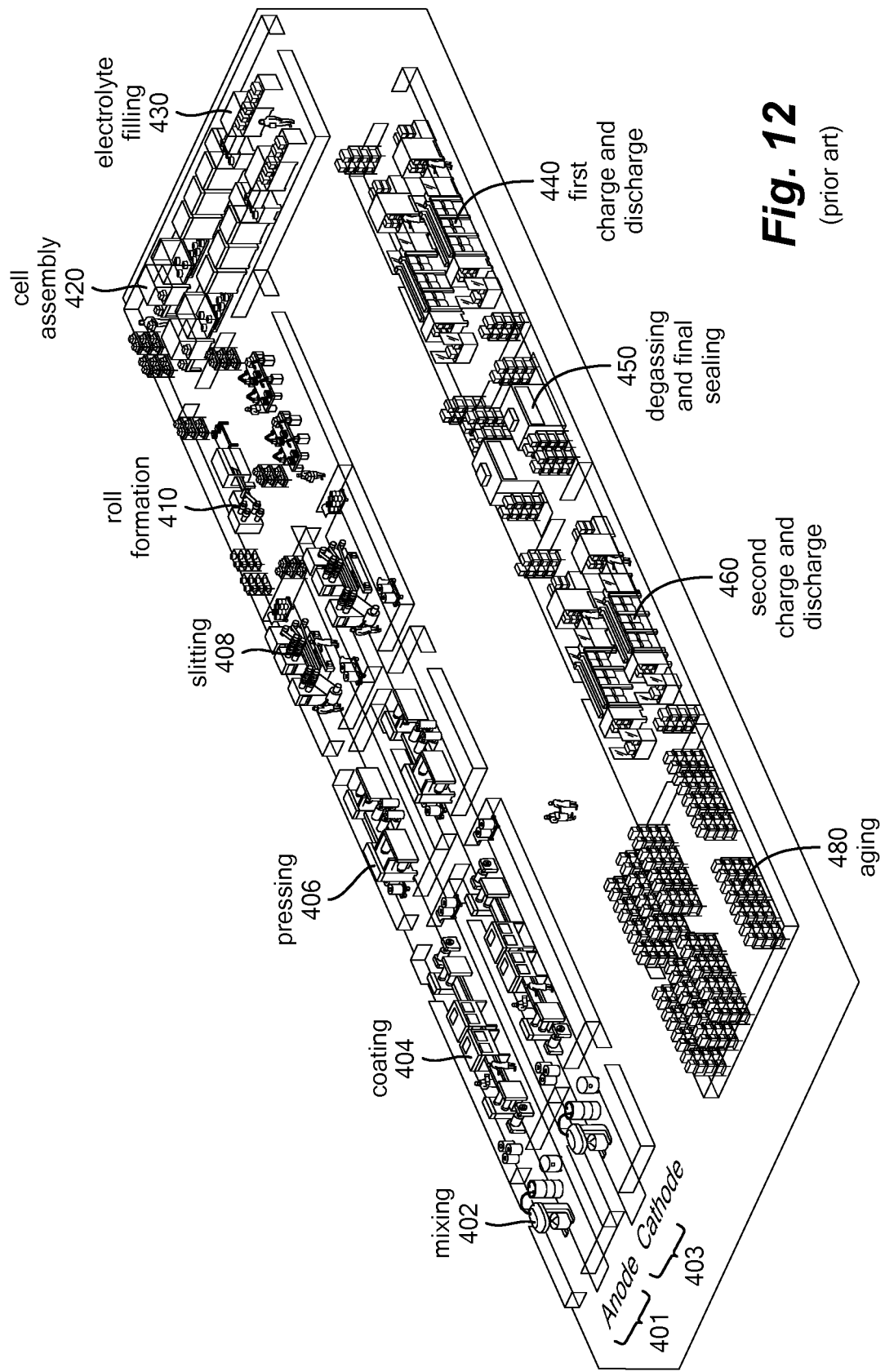
FIG. 12 shows a lithium ion battery manufacturing facility, according to Prior Art.

In a method of manufacturing by electrodeposition the double-sided lithium electrode 315 of the galvanic cell 325 of FIG. 9, an electrolytic cell 305 is used. FIG. 10 shows the electrolytic cell 305 prior to electrodeposition and FIG. 11 shows the electrolytic cell following electrodeposition. According to the method, the electrolytic cell 305 is completely blanketed with a blanketing atmosphere 24, the blanketing atmosphere being inert to chemical reaction with lithium. In a preferred embodiment, the blanketing atmosphere includes no more than 10 ppm of lithium reactive components on a molar basis. In a preferred embodiment, the blanketing atmosphere includes no more than 5 ppm of lithium reactive components on a molar basis. In a preferred embodiment, the blanketing atmosphere includes no more than 10 ppm of nitrogen on a per molar basis. In a preferred embodiment, the blanketing atmosphere includes no more than 5 ppm of nitrogen on a per molar basis. In a preferred embodiment, the blanketing atmosphere includes no more than 1 ppm of nitrogen on a per molar basis. In a preferred environment, the blanketing atmosphere comprises argon with a purity of greater than 99.998 weight percent. In the embodiment of FIGS. 11 and 12, the blanketing atmosphere 24 and the electrolytic cell 5 are enclosed in a gas-impermeable container 500. During the process of electrodeposition, the electrolytic cell 305 is confined to the blanketing atmosphere 24.

The electrolytic cell 305 includes a first chamber 326a, and a second chamber 326b, the first chamber having a proximal end and a distal end, and the second chamber having a proximal and a distal end. Contiguous to and separating the first chamber 326a from the second chamber 326b is the conductive substrate 310, the conductive substrate 310 having a first side facing the first chamber 326a and a second side facing the second chamber 326b. Prior to electrodeposition, as embodied in FIG. 10, the first side and the second side of the conductive substrate 310 are coated with, respectively, a first lithium ion-selective membrane 350a configured to function as a solid state electrolyte, extending into the proximal end of the first chamber 326a, and a second lithium ion-selective membrane 350b, configured to function as a solid state electrolyte, extending into the proximal end of the second chamber 326b. At their distal ends, the first chamber 326a and the second chambers, 326b contain, respectively, positive electrodes 320a and 320b. The positive electrode 320a and the first lithium ion-selective membrane 350a are separated by an aqueous salt solution 340a, the aqueous salt solution 340a physically contacting both the positive electrode 320a and the lithium ion-selective membrane 350a. In a like manner, the positive electrode 320b and the first lithium ion-selective membrane 350b are separated by an aqueous salt solution 340b, the aqueous salt solution 340b physically contacting both the positive electrode 320b and the lithium ion-selective membrane 350b.

After electrodeposition, as shown in FIG. 11, layers of lithium metal, 320a, 320b, are electrodeposited between the conductive substrate 310 and the lithium ion selective membranes, 350a, 350b, respectively, the layers of lithium metal 320a, 320b, bonding to the conductive substrate 310 and the lithium ion selective membranes 350a, 350b, respectively.

During the process of electrodeposition, the lithium ion-selective membranes 350a, 350b, separate the conductive substrate 310 and the electrodeposited lithium metal layers 360a, 360b, respectively, from the lithium salt solutions 340a, 340b.

The lithium ion-selective membranes 350a, 350b are configured function as solid state electrolytes, allowing lithium ions to pass between the aqueous lithium salt solutions 340a, 340b, and the conductive substrate 310, but preventing the passage of other chemical species.

In manufacturing the double-sided lithium metal electrode 315 for the galvanic cell embodied in FIG. 9, a variable voltage is applied across the positive electrodes 320a, 320b and the conductive substrate 310 of the electrolytic cell 305, in order to maintain a constant current, thereby causing lithium ions to move through the aqueous lithium salt solutions 340a, 340b, respectively, through the lithium ion-selective membranes 350a, 350b, respectively, travel to the surface of the conductive substrate 310, where each lithium ion gains an electron, thereby electrodepositing the layers of elemental lithium 360a, 360b onto the first side and the second side, respectively, of the conductive substrate 310, the layers of elemental lithium 360a, 360b thus forming and bonding to the conductive substrate 310 and, respectively, to the lithium ion-selective membranes 350a, 350b. In this manner, as shown in FIGS. 10 and 11, the double-sided lithium metal electrode 315 is manufactured as a sandwich with a central conductive substrate 310 bounded on opposite sides by layers of elemental lithium 360s, 360b, the layers of elemental lithium 360a, 360b in turn bounded by layers of lithium ion-selective membrane 350a, 350b. During the process of electrodeposition, the conductive substrate 310 is stationary in the electrolytic cell.

In some embodiments, the first and second chambers 326a, 326b of the electrolytic cell 305 of FIGS. 10 and 11 are flow chambers, with entrance ports 370a, 370b and exit ports 380a, 380b allowing aqueous lithium salt solutions 340a, 340b to enter the first chamber 326a and the second chamber 326b to provide a renewable supply of lithium ions for electrodepositing.

In preferred embodiments, the constant current is between about 10 mA/cm$^2$ and about 50 mA/cm$^2$. In preferred embodiments, the constant current applied is about 25 mA/cm$^2$ to about 50 mA/cm$^2$. In preferred embodiments, the constant current applied is about 40 mA/cm$^2$ to about 50 mA/cm$^2$. In preferred embodiments, the constant current is applied for a time between about 1 minute and about 60 minutes.

In preferred embodiments, the aqueous lithium salt solution 340a, 340b is selected from the group consisting of $Li_2SO_4$, $Li_2CO_3$, and combinations thereof. In preferred embodiments, the aqueous lithium salt solution 340a, 340b includes $Li_2SO_4$. In preferred embodiments, the lithium ion selective membrane 350a, 350b comprises a polymeric matrix and a plurality of ion-conducting particles disposed within the polymeric matrix. In a preferred embodiment, the lithium ion selective membrane 350a, 350b includes a glass frit with lithium ion conducting particles disposed within.

In an alternative method of manufacturing by electrodeposition the double-sided lithium electrode 315 of the galvanic cell 325 of FIG. 9, the electrolytic cell 105 of FIG. 5 is used. According to this method, the lithium ion selective membranes 150a, 150b and the conductive substrate 110 each remain stationary in the electrolytic cell. A variable voltage is applied across the positive electrodes 120a, 120b and the conductive substrate 110 of the electrolytic cell 105, in order to maintain a constant current, thereby causing lithium ions to move through the aqueous lithium salt solutions 140a, 140b, cross from the first and fourth chambers 126a, 126b to the second and third chambers 128a, 128b, respectively, through the lithium ion selective membranes 150a, 150b, into the non-aqueous electrolytes 130a, 130b, travel to the first and the second faces of the conductive substrate 110, where each lithium ion gains an electron, thereby causing layers of elemental lithium 160a, 160b to be electrodeposited on the conductive substrate 110. As the layers of elemental lithium 160a, 160b grow, they displace non-aqueous electrolytes 130a, 130b from the second and third chambers 128a, 128b, respectively, eventually coming into contact with and bonding to the lithium ion selective membranes 150a, 150b, thereby forming the double-sided lithium metal electrode 315 of FIG. 9, comprising the conductive substrate 110 and the layers of lithium 160a, 160b, wherein the layers of lithium 160a, 160b are bonded, respectively on the first and second faces of the conductive substrate 110 and to the lithium ion-selective membranes 150a, 150b, wherein the lithium ion-selective membranes 150a, 150b, are configured to function as solid state electrolytes.

In preferred embodiments, the lithium metal electrodes described herein can be integrated into batteries, including but not limited to the batteries embodied in FIGS. 6 and 9.

The methods described above are well-suited for vertically integrated battery production, thereby allowing for a supply chain for LMB production that is regionally controlled in any region where lithium is mined (for example, in the US). The development of such a local regional supply chain greatly reduces costs, and provides LMBs that are inherently cobalt free.

A typical fabrication facility for lithium ion batteries according to the prior art is shown in FIG. 12. Manufacturing stages involve fabrication of anodes 401 and cathodes 403, cell assembly and cell finishing and testing. Anodes 401 and cathodes 403 follow parallel tracks involving mixing 402 to form a slurry, coating 404 onto conductive foil, pressing 406 to bond coating to foil, and slitting 408 to form desired electrode dimensions. Following roll formation 410, cells are assembled 420, filled with electrolyte and sealed 430. Because LIB cells are manufactured in a fully discharged state, the final stage of the process involves cell finishing, a time-consuming that may include steps of charge and discharge 440, degassing and final sealing 450, further charge and discharge 460 and finally aging 480. Because of the multiple, time-consuming steps, the finishing process can take between 20-30 days.

According to the embodiments described above, lithium metal electrodes can be fabricated in situ, thereby providing lithium metal anodes for LMBs in a fully charged state. According to the embodiment of FIG. 13, the processes described above for lithium metal anode fabrication can be vertically integrated into a cost- and energy-efficient manufacturing method for LMBs. As embodied in FIG. 13, the cathode 403 is still manufactured by conventional methods involving mixing 402, coating 404, and pressing 406. However, the working anode is now formed by electrolysis 405 according to the process embodied in FIG. 1, involving blanketing an electrolytic cell with a blanketing atmosphere 2, applying constant current to the cell 4, flowing Li+ across a lithium selective membrane 6, reducing Li+ to Li metal 8, and fabricating a Li metal battery 12, by steps involving pouch formation 412, cell assembly 420, cell filling and sealing 430, and finishing steps 490. Cell assembly 420 includes the steps of assembling a casing with contents including the working anode, and other components to form a lithium metal battery, and sealing the casing to isolate the contents from reactants present in the air.

Figure 13:
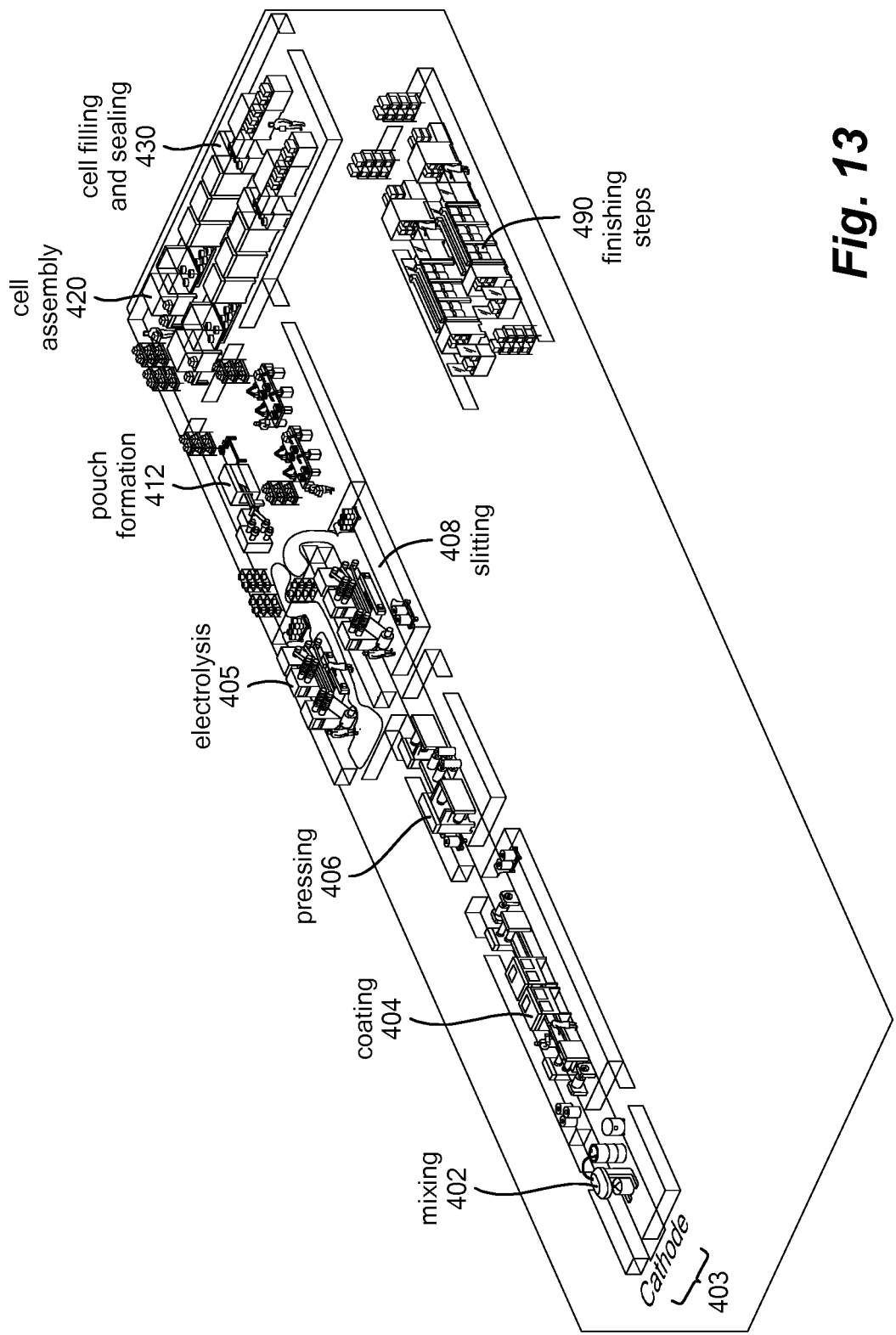
FIG. 13 shows a vertically integrated lithium metal battery manufacturing facility with manufacturing as embodied in the methods described in the current application.

As embodied in FIG. 13, LMB manufacture according to the current invention is a vertically integrated process that replaces the anode fabrication process by an in situ low-temperature electrodeposition process, utilizing as feedstock an aqueous lithium salt solution, where the electrodeposition occurs through a lithium ion selective membrane to produce a highly pure lithium metal anode, resistant to dendrite formation. Because lithium metal negative electrodes are fabricated in a fully charged state, the lengthy formation process required for lithium ion batteries is not required.

Because of the use of the lithium ion selective membrane, and the high current densities, a relatively inexpensive impure feed such as $Li_2SO_4$ can be used for electrodeposition, saving energy and reducing costs. Impurities in the lithium metal anodes are further reduced by performing the electrodeposition entirely in a blanketing atmosphere, substantially depleted of lithium reactive components including nitrogen, oxygen, ozone, oxides of nitrogen, sulfur and phosphorous, carbon dioxide, halogens, hydrogen halides, and water. In preferred embodiments, the inert atmosphere is purified argon gas. In some embodiments, steps following electrodeposition, including cell assembly, electrolyte/cell filling and sealing are also performed in the inert atmosphere. In other embodiments, only the lithium electrodeposition occurs under inert atmosphere, with remainder of battery manufacturing processes taking place in "dry air," where dry air refers to air with less than 1% RH (relative humidity) (−45° C. dew point). In preferred embodiments, during LMB manufacture the temperature is kept between about 20° C. and about 30° C. In preferred embodiments, during LMB manufacture the temperature is kept between about 23° C. and about 27° C.

Figure 14:
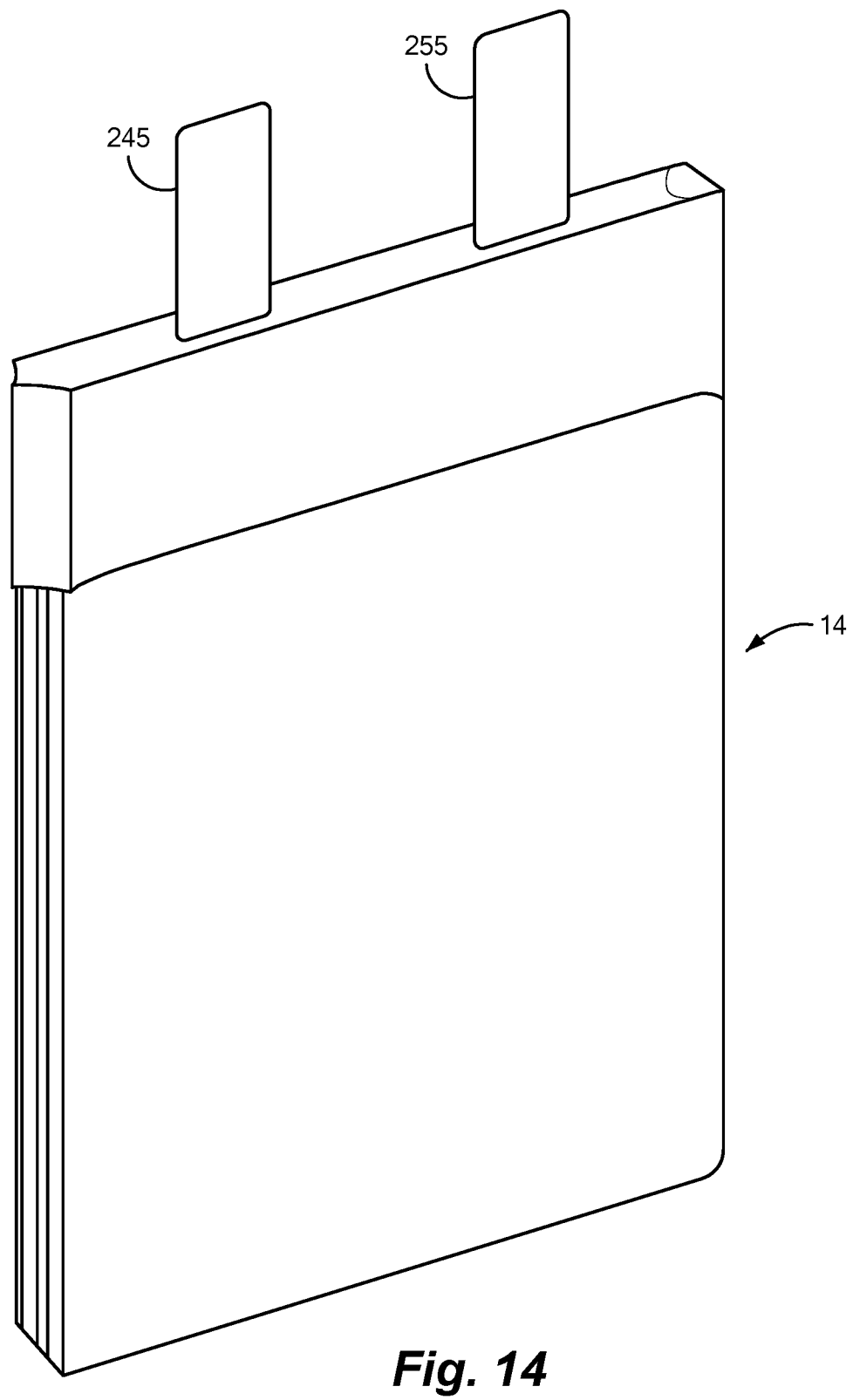
FIG. 14 shows a battery case for a battery with a single-sided lithium anode according to embodiments of the invention.
Figure 15:
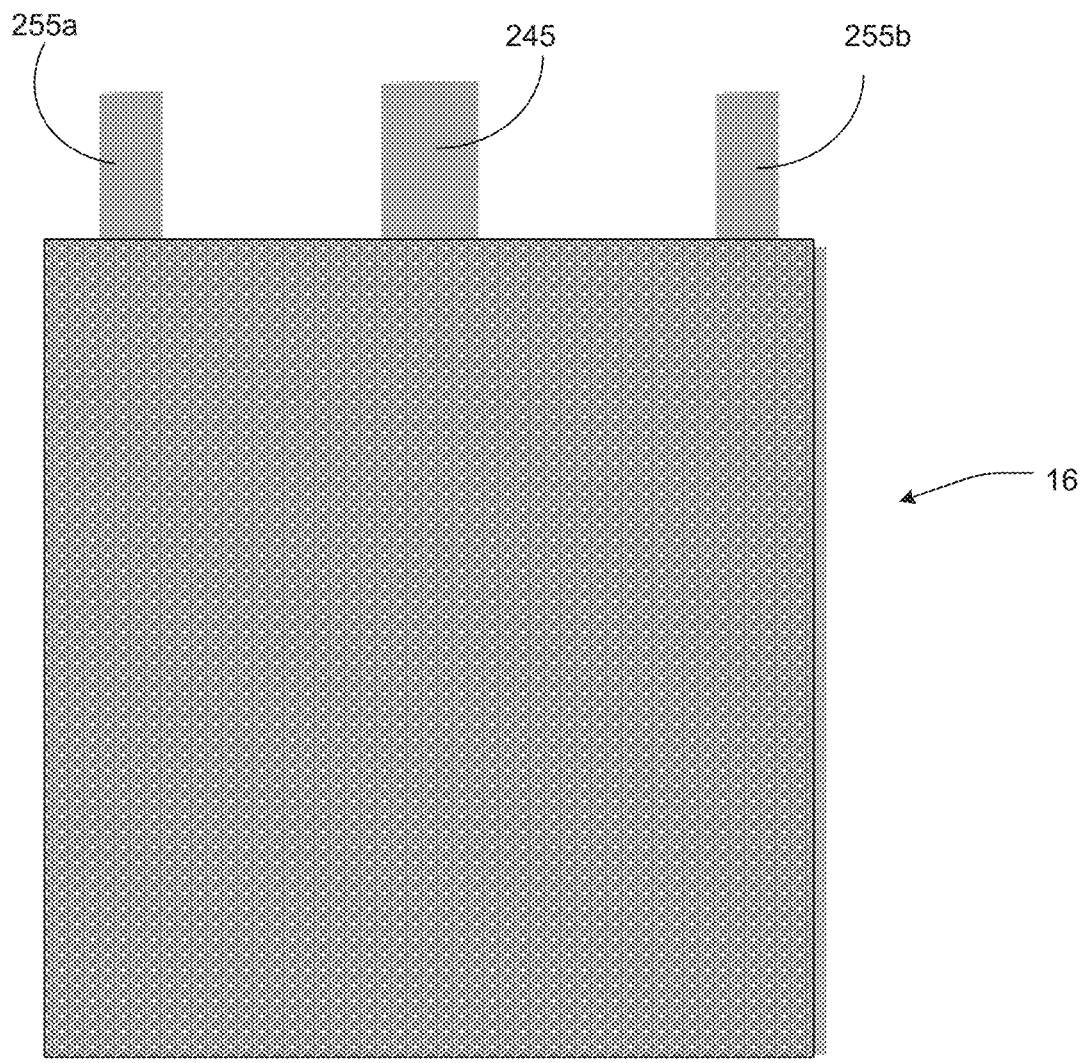
FIG. 15 shows a battery case for a battery with a double-sided lithium anode according to embodiments of the invention.

A variety of different LMB battery configurations are understood to be encompassed by the invention described above. FIG. 14 embodies a single-cell battery configuration 14, shown as manufactured with a battery case, showing electrical contacts to the anode 245 and to the cathode 255. FIG. 15 embodies a double-cell battery configuration 16, as manufactured with a battery case, showing a single electrical contact to the anode 245, and two electrical contacts 255a, 255b, to the cathode.

The embodiments of the invention described above are intended to be merely exemplary; numerous variations and modifications will be apparent to those skilled in the art. All such variations and modifications are intended to be within the scope of the present invention as defined in any appended claims.

What is claimed is:
1. A lithium metal electrode, comprising:
a conductive substrate;
a first layer of lithium metal having an inner face and an outer face, the inner face bonded to the conductive substrate;
wherein the first layer includes no more than five ppm of non-metallic elements by mass, and
wherein the first layer of lithium metal is devoid of nanorods.
2. The lithium metal electrode of claim 1 wherein the conductive substrate comprises a plate having a first face and a second face, wherein the inner face of the first layer of lithium metal is bonded to the first face of the conductive substrate.
3. The lithium metal electrode of claim 2 further comprising a second layer of lithium metal having an inner face and an outer face, the inner face of the second layer of lithium metal being bonded to the second face of the conductive substrate, wherein the second layer includes no more than five ppm of non-metallic elements by mass.

4. The lithium metal electrode of claim 1 wherein the first layer includes no more than one ppm of non-metallic element by mass.

5. The lithium metal electrode of claim 1 wherein the first layer includes no more than one ppm nitrogen by mass.

6. The lithium metal electrode of claim 1 wherein the electrode has a specific capacity of greater than about 3800 mAh per gram of lithium metal.

7. The lithium metal electrode of claim 1 wherein the first layer of lithium metal has a density of between about 0.45 g/cm$^3$ and about 0.543 g/cm$^3$.

8. The lithium metal electrode of claim 1, wherein the conductive substrate is selected from the group consisting of copper, aluminum, graphite coated copper, and nickel.

9. The lithium metal electrode of claim 1, wherein the outer face of the first layer of lithium metal is bonded to a first lithium ion-selective membrane.

10. The lithium metal electrode of claim 9, wherein the conductive substrate comprises a plate having a first face and a second face, wherein the inner face of the first layer of lithium metal is bonded to the first face of the conductive substrate.

11. The lithium metal electrode of claim 10, further comprising a second layer of lithium metal having an inner face and an outer face, wherein the second layer of lithium metal includes no more than 5 ppm of non-metallic elements by mass, wherein the inner face of the second layer of lithium metal is bonded to the second face of the conductive substrate, and wherein the outer face of the second layer of lithium metal is bonded to a second lithium ion-selective electrode.

12. The lithium metal electrode of claim 1, the first layer of lithium metal having a thickness between about 1 micron and about 50 microns.

13. The lithium metal electrode of claim 1, the lithium metal layer having a thickness between about 1 micron and about 10 microns.

14. A lithium metal battery comprising the lithium metal electrode of claim 1.

15. The lithium metal electrode of claim 1, manufactured according to a method comprising:
(1) providing a gas-impermeable container, the container enclosing:
a blanketing atmosphere, the blanketing atmosphere having no more than 10 ppm of lithium reactive components on a molar basis;
an electrolytic cell, the electrolytic cell being blanketed completely by the blanketing atmosphere, and including:
a first chamber containing a positive electrode, and an aqueous lithium salt solution in contact with the positive electrode;
a second chamber containing a conductive substrate configured as a negative electrode, the conductive substrate being immovable within the second chamber, a lithium ion-selective membrane separating the first chamber from the second chamber, a space separating the conductive substrate and the lithium ion-selective membrane, and a non-aqueous electrolyte disposed in the space between the conductive substrate and the lithium ion selective membrane, physically contacting both the conductive substrate and the lithium ion selective membrane;
the electrolytic cell being configured to allow passage of lithium ions through the lithium ion selective membrane between the first and the second chambers, and to preclude the passage of other chemical species between the first and the second chambers;
(2) applying a variable voltage in order to maintain a constant current across the negative electrode and the positive electrode, thereby causing lithium ions to cross from the first chamber to the second chamber, through the lithium ion selective membrane and the non-aqueous electrolyte, and electroplate a layer of lithium onto the conductive substrate, the layer of lithium having an inner face bonded to the conductive substrate and an outer face directed towards the lithium ion-selective membrane, thereby forming the lithium metal electrode, comprising the layer of lithium bonded to the conductive substrate,
wherein the constant current is between about 10 mA/cm$^2$ and about 50 mA/cm$^2$, and wherein the constant current is applied for a time between about 1 minute and about 60 minutes.

16. The lithium metal electrode of claim 15, wherein the lithium ion selective membrane is stationary within the electrolytic cell, and wherein as the layer of lithium is formed, the layer of lithium displaces non-aqueous electrolyte from the space between the conductive substrate and the lithium ion-selective membrane, thereby bonding an inner face of the first layer of lithium to the conductive substrate and the outer face of the first layer of lithium to the ion selective membrane, thereby forming a lithium metal electrode comprising the conductive substrate and the layer of lithium metal, with the inner face of the layer of lithium bonded to the conductive substrate, and the outer face of the layer of lithium bonded to the lithium ion-selective membrane, which is configured to function as a solid state electrolyte when the lithium metal electrode is incorporated into a galvanic cell.

17. A lithium metal battery comprising the lithium metal electrode of claim 3.

18. A lithium metal battery comprising the lithium metal electrode of claim 9, the first lithium ion-selective membrane being configured as a solid state electrolyte.

19. A lithium metal battery comprising the lithium metal electrode of claim 11, the second lithium ion-selective membrane further being configured as a solid state electrolyte.

20. The lithium metal electrode of claim 9, manufactured according to a method comprising:
(1) providing a gas-impermeable container, the container enclosing:
a blanketing atmosphere, the blanketing atmosphere having no more than 10 ppm of lithium reactive components on a molar basis;
an electrolytic cell, the electrolytic cell being blanketed completely by the blanketing atmosphere, and including:
a conductive substrate, immovable within the container, configured as a negative electrode;
a positive electrode;
an aqueous lithium salt solution interposed between the conductive substrate and the positive electrode;
a lithium ion-selective membrane covering the conductive substrate, configured as a solid state electrolyte, and forming a barrier separating the aqueous lithium salt solution and the conductive substrate;

the electrolytic cell being configured to allow passage of lithium ions from the lithium salt solution through the lithium ion selective membrane and onto the surface of the conductive substrate, and to preclude the passage of other chemical species;

(2) applying a variable voltage in order to maintain a constant current across the negative electrode and the positive electrode, thereby causing lithium ions to cross from the lithium salt solution through the lithium ion selective membrane, and electroplate the first layer of lithium onto the conductive substrate, the inner face of the first layer of lithium thereupon being bonded to the conductive substrate, and the outer face being bonded to the lithium ion selective membrane;

wherein the constant current is between about 10 mA/cm$^2$ and about 50 mA/cm$^2$, and wherein the constant current is applied for a time between about 1 minute and about 60 minutes.

21. The lithium metal electrode of claim 15, wherein the aqueous lithium salt solution comprises a lithium salt selected from the group consisting of $Li_2SO_4$, $Li_2CO_3$, and combinations thereof.

22. The lithium metal electrode of claim 15, wherein the aqueous lithium salt solution comprises $Li_2SO_4$.

23. The lithium metal electrode of claim 15, wherein the lithium ion selective membrane comprises a polymeric matrix and a plurality of ion-conducting particles disposed within the polymeric matrix.

24. The lithium metal electrode of claim 15, wherein the blanketing atmosphere comprises argon with a purity of greater than 99.999 mole percent.

25. The lithium metal electrode of claim 15, wherein the constant current is between about 25 mA/cm$^2$ and about 50 mA/cm$^2$.

* * * * *